United States Patent [19]

Dybel et al.

[11] Patent Number: 4,633,720
[45] Date of Patent: Jan. 6, 1987

[54] LOAD MONITORING SYSTEM FOR PROGRESSIVE DIES

[76] Inventors: Frank R. Dybel; William P. Dybel, both of 981 Wingate Rd., Olympia Fields, Ill. 60461

[21] Appl. No.: 682,428

[22] Filed: Dec. 17, 1984

[51] Int. Cl.⁴ .................. G01L 5/00; G01D 1/12
[52] U.S. Cl. ........................ 73/862.53; 73/770; 100/99; 364/506
[58] Field of Search ........... 73/764, 770, 813, 862.53, 73/862.54; 100/99; 340/665; 364/506, 508

[56] References Cited

U.S. PATENT DOCUMENTS

| | | |
|---|---|---|
| 3,612,966 | 10/1971 | Dybel . |
| 3,680,365 | 8/1972 | Summers . |
| 3,884,068 | 5/1975 | Dybel . |
| 3,930,248 | 12/1975 | Keller .................... 364/506 X |
| 3,965,744 | 6/1976 | Gutjahr . |
| 4,016,744 | 4/1977 | Williams .................. 73/770 X |
| 4,023,044 | 5/1977 | Miller et al. . |
| 4,048,848 | 9/1977 | Dybel ................. 73/862.53 X |
| 4,059,991 | 11/1977 | Dybel et al. . |
| 4,062,055 | 12/1977 | Dybel et al. . |
| 4,116,050 | 9/1978 | Tanahashi et al. ........ 364/508 X |
| 4,171,646 | 10/1979 | Dybel et al. . |
| 4,177,517 | 12/1979 | Mette et al. ............ 364/506 X |
| 4,195,563 | 4/1980 | Budraitis et al. . |
| 4,289,022 | 9/1981 | Dybel et al. . |
| 4,453,421 | 6/1984 | Umano ................... 364/506 X |

FOREIGN PATENT DOCUMENTS 2743599 4/1978 Fed. Rep. of Germany .

OTHER PUBLICATIONS

Load Meter Model No. N402, Toledo Transducers Inc., Toledo, Ohio (Apr. 24, 1981).
Load Meter Model No. N312L, Toledo Transducers Inc., Toledo, Ohio (Aug. 7, 1979).
Automatic Tonnage Meter Series N200 Instruction Manual, Toledo Transducers Inc., Toledo, Ohio (1981).
Portable Load Monitor, Toledo Transducers Inc., Toledo, Ohio (1980).
"Ton-Dial", *Metal Stamping*, p. 29, (Jul. 1981).

Primary Examiner—Charles A. Ruehl
Attorney, Agent, or Firm—Leydig, Voit & Mayer

[57] ABSTRACT

A press control system monitors and is responsive to the loads associated with individual die stations in a progressive die. The system detects chipped, dull, or excessively loaded portions of the progressive die and provides automatic quality monitoring of the parts produced by the press. The system provides a display of press load as a function of time scaled by the speed of the press. The press load as a function of time is automatically analyzed to determine and display the number of die stations and the peak loads associated with each die station in the progressive die. The peak loads are compared to limit values that depend in part on the past history of the press in order to monitor the condition of the progressive die and if necessary to shut down the press. The number and quality of parts produced by the press are also determined from the peak loads. Gradual wear of the die is monitored to determined when sharpening is required. To detect anomalies at any phase in the press cycle, the press load is compared between successive cycles. A master/slave computer system is disclosed for monitoring and controlling multiple presses.

40 Claims, 24 Drawing Figures

IMCO PRESS ANALYSIS PROGRAM

| CORPORATION | LOCATION | DEPARTMENT | DEPT.NO. | BUILDING | SHIFT NO. | SUPERVISOR | FOREMAN |
|---|---|---|---|---|---|---|---|
| XYZ | FLINT, MICH. | STAMPING | 2345 | 37 | 1 | T. JONES | A. SMITH |

DIE STATION ANALYSIS   PRESS: 5000

| DIE STATION NUMBER | INITIAL DIE LOAD | TODAYS DIE LOAD | PERCENT LOAD CHANGE | INITIALS LIMIT SET | MAT'RL % LIMIT SET | PERCENT LIMIT EXCEEDED | TOOLING DAMAGED | TOOL TOP STATION | TOOL BOTTOM STATION | DAMAGED NO. OF TIMES | NOTES |
|---|---|---|---|---|---|---|---|---|---|---|---|
| #1 | 154 | 460 | 198 | 10 | 5 | YES | N | N | N | 0 | |
| #2 | 351 | 464 | 32 | 10 | 5 | YES | N | N | N | 0 | |
| #3 | 260 | 416 | 60 | 10 | 5 | YES | N | N | N | 0 | |
| #4 | 247 | 357 | 44 | 10 | 5 | YES | N | N | N | 0 | |

Fig. 5.

PRESS AND DIE LOADING GRAPHIC LAYOUT

| PRESS NUMBER | PRESS TYPE | DIE NUMBER | PRESS % LOAD | PRESS LAYOUT REFERENCE | PRESS TONNAGE LOADING | PRESS TONNAGE RATING | PRESS PT. % OL. | DIE LOAD | DIE RATING | DIE RATING & LOAD |
|---|---|---|---|---|---|---|---|---|---|---|
| 1000 | 2Pt SS | 200 | 90%-110% | L.S.-R.S. | 90T-110T | 100T-100T | 0-0 | 190T | 200T | 95 |
| 2000 | 1Pt SS | 300 | 90% | 1PT. | 270T | 300T | 0 | 270T | 300T | 90 |
| 3000 | 3Pt OA | 400 | 90-80-90 | L.S.-mer-R.S. | 45T-80T-45T | 50T-100T-50T | 0-0-0 | 80T | 100T | 80 |
| 4000 | 4Pt SS | 500 | 90 90 / 90 90 | LR RR / LF RF | 90T 90T / 90T 90T | 100T 100T / 100T 100T | 0 0 / 0 0 | 360T | 400T | 90 |

Fig. 6.

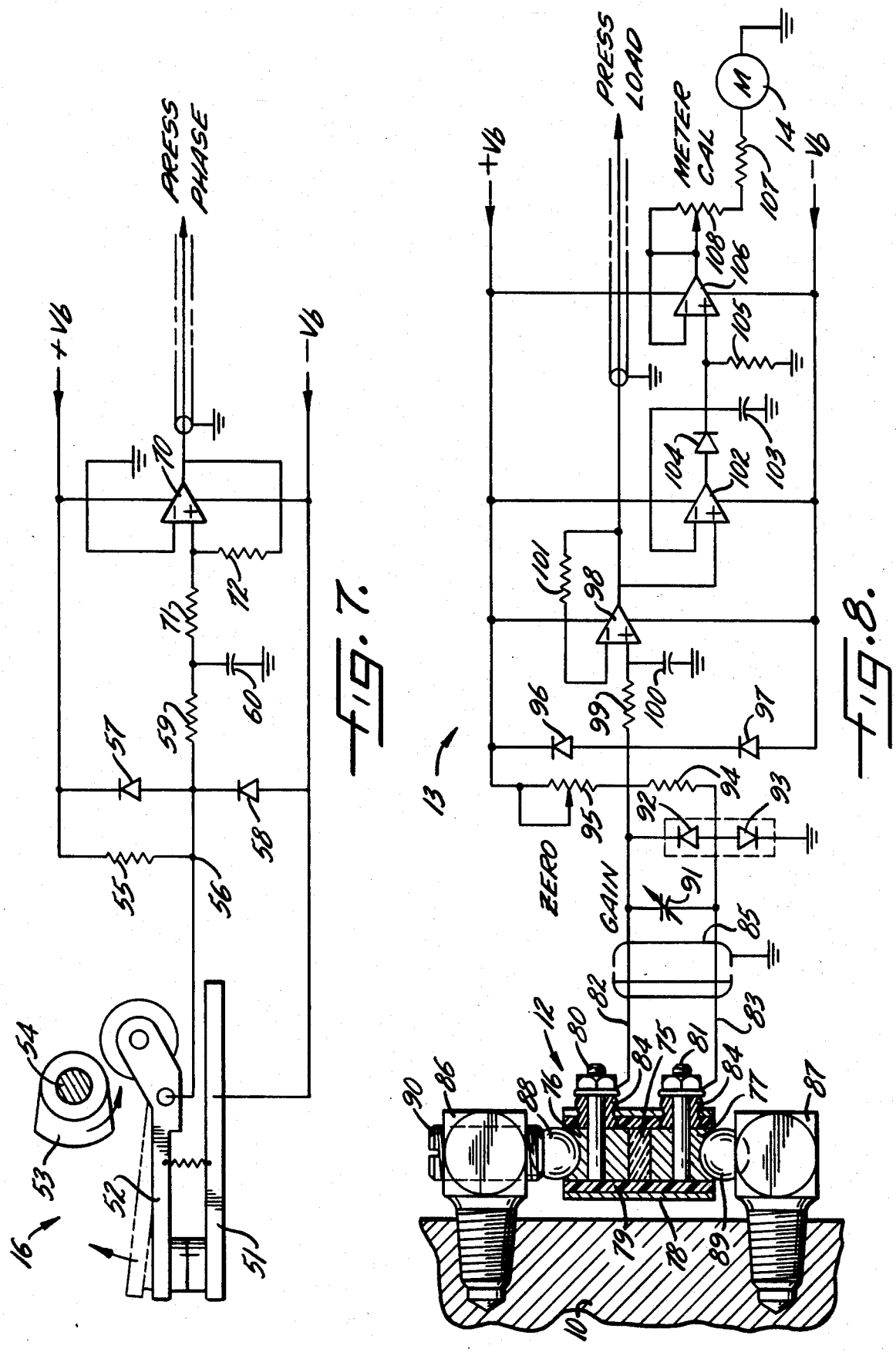

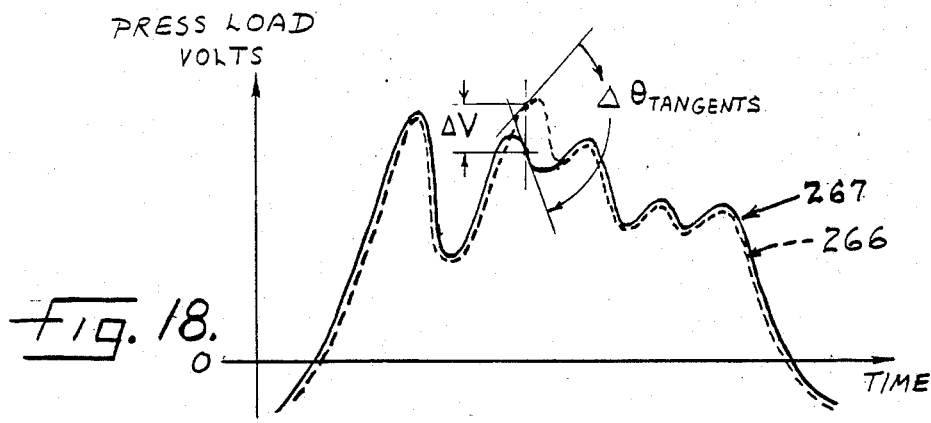
Fig. 18.
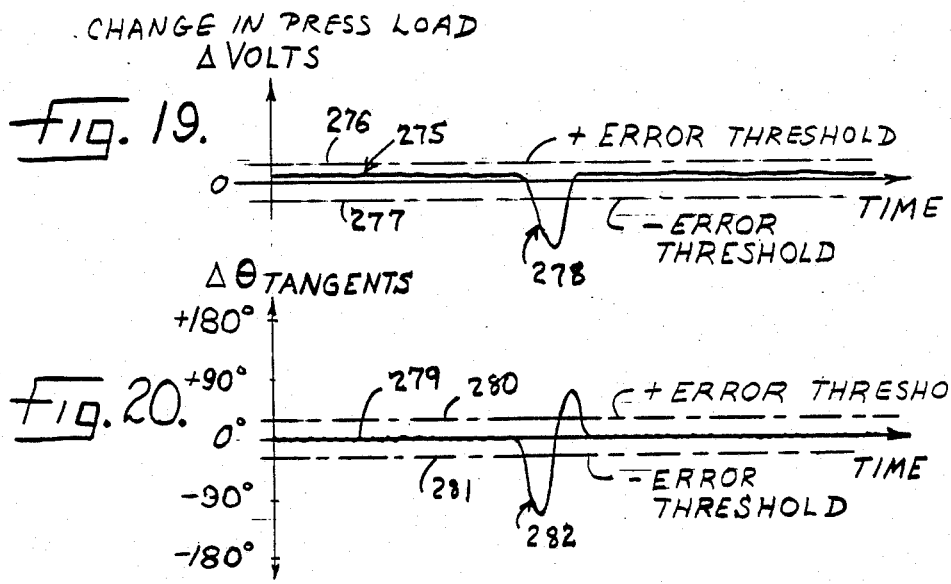
Fig. 19.
Fig. 20.
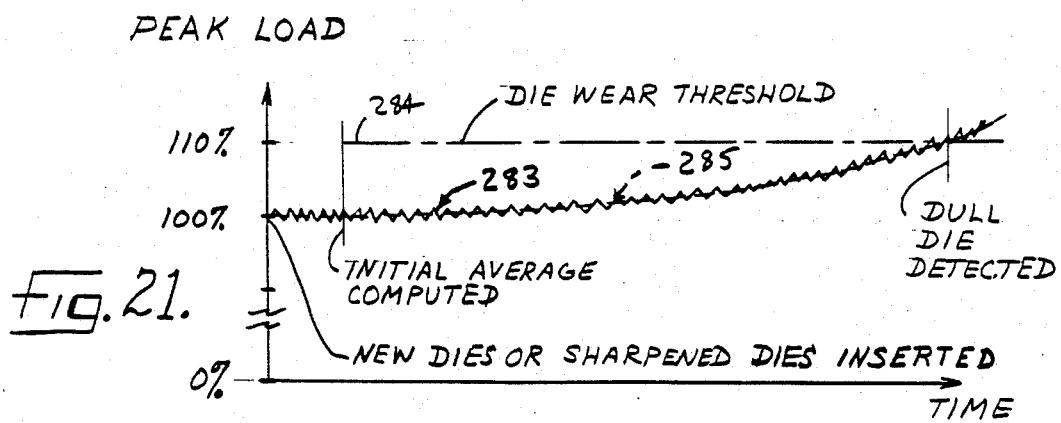
Fig. 21.

LOAD MONITORING SYSTEM FOR PROGRESSIVE DIES

BACKGROUND OF THE INVENTION

The present invention relates generally to load monitoring systems, and more particularly, to systems for monitoring and controlling loads incurred by force carrying members, such as pitmans of production presses.

Load monitoring systems are known at present for indicating the loads on presses and for automatically detecting if the load incurred by the force carrying member exceeds a predetermined value or is below a predetermined value. Systems, such as shown in the applicant's U.S. Pat. No. 4,062,055, have been found to be highly valuable in controlling costly overload breakdowns and detecting production line delays resulting from the failure of a workpiece to be loaded into the press at the appropriate time. Such systems in general provide a transducer attached to the force carrying member of the press which generates an electrical load signal substantially proportional to the load exerted on the force carrying member. In addition such systems provide a high load limit circuit and a low load limit circuit which respectively determine whether the load signal exceeds a predetermined value (an overload) or is below a predetermined value (an underload). As set forth in greater detail in U.S. Pat. No. 4,062,055, the ability to detect an overload and an underload of the press provides significant advantages in controlling the production of the press.

For the stamping or punching of intricate parts in a press, it is common to use a progressive die having a plurality of individual die stations which are effectively active only at certain phases in the press cycle. A progressive die, in other words, is somewhat equivalent to a plurality of individual dies driven by a common press. The system as shown in U.S. Pat. No. 4,062,055, however, cannot independently monitor each of the die stations in the progressive die, since it is responsive to the maximum load during the entire cycle and the failure of a minimum load to be achieved in the press cycle.

SUMMARY OF THE INVENTION

Accordingly, the primary object of the present invention is to provide a press control system which monitors and which is responsive to the loads associated with individual die stations in a progressive die.

Another object of the invention is to provide a press control system for detecting chipped, dull, or excessively loaded portions of a progressive die.

A further object of the present invention is to provide an automatic quality control system for presses using progressive dies or dies with multiple stations.

Yet another object of the invention is to provide a display of press load as a function of time scaled by the speed of the press.

Still another object of the invention is to provide automatic analysis of the press load as a function of time to determine and display the number of die stations and the peak loads associated with each die station in a progressive die.

And yet another object of the invention is to provide a system for detecting abnormalities in press loading over all phases of a press cycle.

Moreover, it is an object of the invention to provide an automatic press monitoring system for progressive dies which senses die wear and supplies data to an accounting or production control computer system, including the number of acceptable die loads or acceptable parts, the number of unacceptable die loads or damaged and rejected parts produced by the press, and the remaining lifetime of the dies.

And still another object of the invention is to provide an economical system for monitoring and controlling a large number of presses.

BRIEF DESCRIPTION OF THE DRAWINGS

Other objects and advantages of the invention will become apparent upon reading the following detailed description and upon reference to the drawings in which:

FIG. 5 is an illustration of a format for summarizing the data collected by the system shown in FIG. 1 for a progressive die having four die stations;

FIG. 6 is an illustration of a format for summarizing data from a number of presses, each having a control system similar to that shown in FIG. 1;

FIG. 7 is a schematic diagram of an embodiment of a resolver means for generating a signal indicating a predetermined phase of the load cycle for the press shown in FIG. 1;

FIG. 8 is a schematic drawing of the preferred transducer means and a transducer amplifier or interface for generating a press load signal;

FIG. 18 is a pictorial diagram of two successive cycles of the press load signal, one cycle being laid over the other;

FIG. 19 is a graph of the difference or overlap comparison between the two press load cycles shown in FIG. 18;

FIG. 20 is a graph of a feature or slope comparison between the two press load cycles shown in FIG. 18;

FIG. 21 is a graph of the peak load over a long time interval for a particular die station showing the sensing of die wear and dulling;

Figure 1:
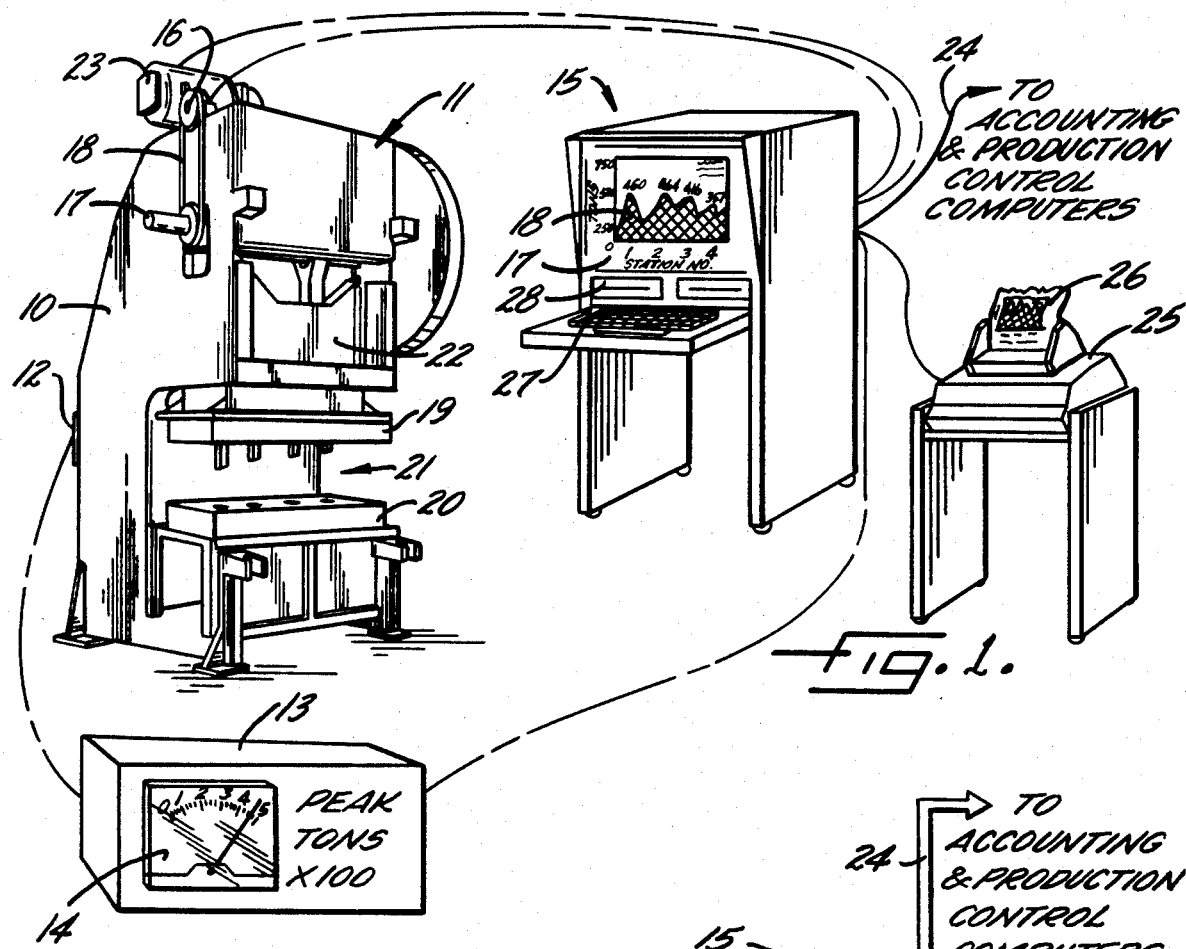
FIG. 1 is a pictorial physical diagram of an exemplary punch press control system according to the invention.

While the invention is susceptible of various modifications and alternative constructions, certain illustrative embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention as defined by the appended claims.

DESCRIPTION OF THE PREFERRED EMBODIMENT

Referring more particularly to FIG. 1 of the drawings, there is shown an illustrative system embodying the present invention for monitoring loads that are cyclically incurred by a force carrying member 10, such as the pitman of a production press generally designated 11. Depending on the type of press 11 and the particular circumstances, it is advantageous to monitor the loads on other press members as well, including but not limited to tie rods, crowns, beds, columns, bearing caps, gap slides, and links in double-action presses. The system includes a transducer 12, which may be of the type described in U.S. Pat. No. 3,612,966 issued to Frank R. Dybel, an inventor of the present invention. The transducer 12 generates a high impedance signal conveyed to an amplifier 13 for generating a low impedance signal. The amplifier 13 is conveniently provided with a peak indicating display or meter 14 which gives the press operator an assuring conventional indication of the output signal from the transducer 12. It should be noted, however, that the system shown in FIG. 1 is fully automatic and the meter 14 may become unnecessary once the press operators become accustomed to the automatic system. A suitable amplifier 13 and peak indicating meter 14 is already described in the load monitoring system with high and low load control described in U.S. Pat. No. 4,062,055 issued to Frank R. Dybel, an inventor of the present invention.

Figure 15:
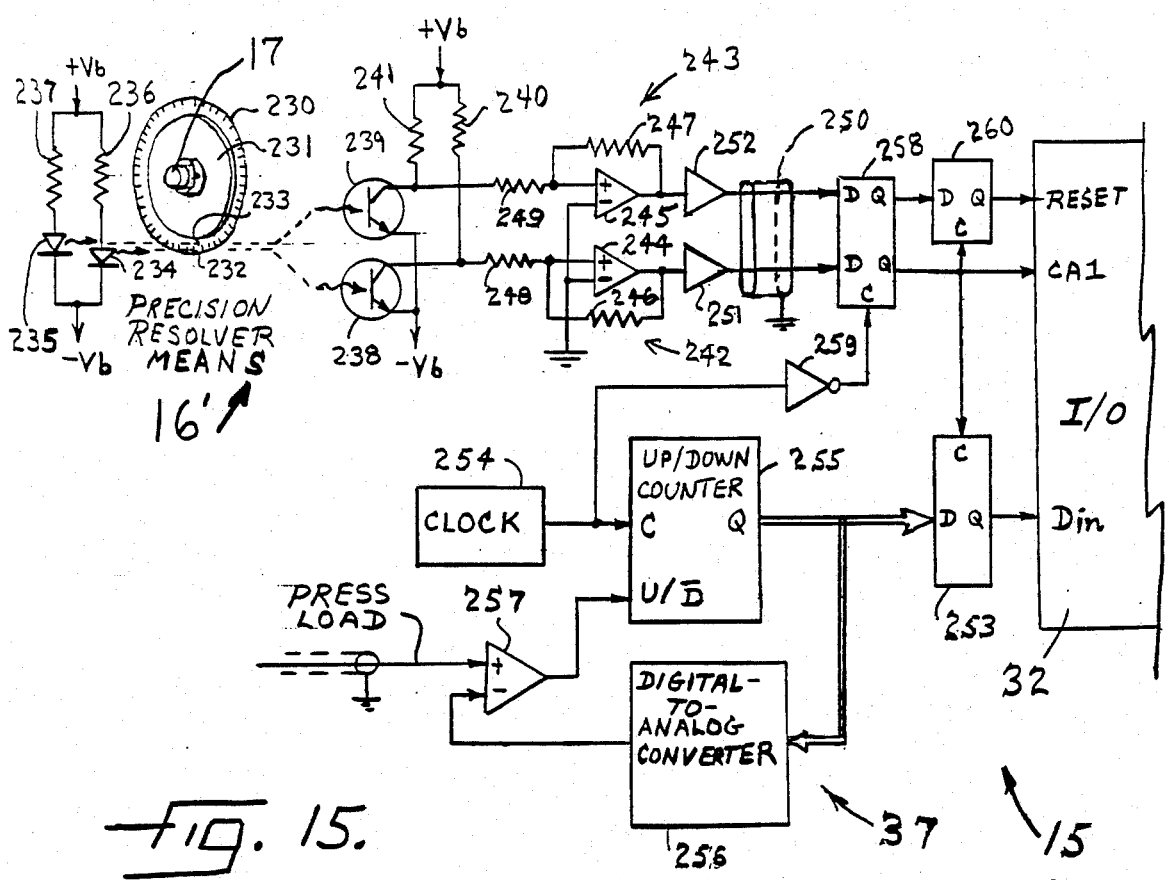
FIG. 15 is a schematic diagram of a precision resolver means and an analog-to-digital converter for digitizing the press load signal at predefined phase points for performing a signature or waveform comparison.

The low impedance load indicating signal from the amplifier 13 is fed to a microcomputer generally designated 15 which also receives a press phase indicating signal from the punch press 11. The press phase signal is generated by a resolver means such as a cam operated switch generally designated 16 coupled to the press crank shaft 17 via a no-slip belt 18. Alternatively the resolver means could be comprised of a magnetic or optic means for sensing the angular position of the crank shaft 17 directly as is illustrated in FIG. 15 and further described below. It is also possible to generate a timing or press phase signal from the output of the transducer 12, as is described in U.S. Pat. No. 4,289,022 issued to Frank R. Dybel, an inventor of the present invention.

The microcomputer 15 is programmed to graphically display the press load signal from the amplifier 13 as a function of time, the display being started or triggered by the press phase signal from the resolver means 16. The display 18 appears on the face of a cathode ray tube 18'. The graph 18 is shown having four peaks indicating that the press 11 is fitted with top and bottom progressive dies 19, 20 of male and female type, respectively. The dies have four individual die stations generally designated 21 that become active in a staggered sequence as the press piston or ram 22 is lowered to engage the dies 19, 20. As is evident from FIG. 1, the die stations 21 become active starting with the leftmost die station and ending with the rightmost die station. The sequence is, however, staggered to more evenly distribute the impact loads on the ram 22.

It should be noted that the microcomputer 15 finds the individual peak loads without knowing beforehand the respective times at which the peaks occur. Once the microcomputer has determined the peak loads for the individual die stations, the microcomputer compares the peak loads to predetermined threshold values to determine if the peak loads substantially deviate from normal or permissible operating ranges. If, for example, any of the peak loads exceed respective predetermined high load thresholds, the microcomputer 15 turns off the press motor 23, emits an audio tone or warning signal to attract the operator's attention, and further identifies the particular die station having the excessive peak load. By comparing the peak loads of the individual die stations to both high and low thresholds, the microcomputer 15 can detect chipped, dull, or excessively loaded die stations 21. The microcomputer 15 can presume, for example, that an acceptable die load results in an acceptable part, and an excessive die load results in a damaged part which should be rejected. Such damaged parts may be deflected from the part stream (not shown) to a reject bin (not shown) by suitable means controlled by the microcomputer 15, and the microcomputer 15 may be connected via a link 24 to accounting and production control computers which keep track of and use the number of parts produced or rejected to determine the current efficiency of the operation and inventory levels. As described further below in conjunction with FIGS. 15-19, the load monitoring system can also store and compare the entire waveshape of the press load between cycles to sense developing problems such as dulling or cracking and chipping of the dies which might not necessarily be evident merely by analysis of the peak loads.

The microcomputer 15 is also linked to a printer 25 which produces a hard copy 26 of the graph 18 upon an operator request entered via the microcomputer's keyboard 27. The operator may further enter commands at the keyboard 27 for generating various kinds of statistical summaries of the peak load data generated by the microcomputer 15. The raw peak load data and also the summaries are conveniently recorded on floppy disks by the microcomputer's disk drives 28.

Figure 2:
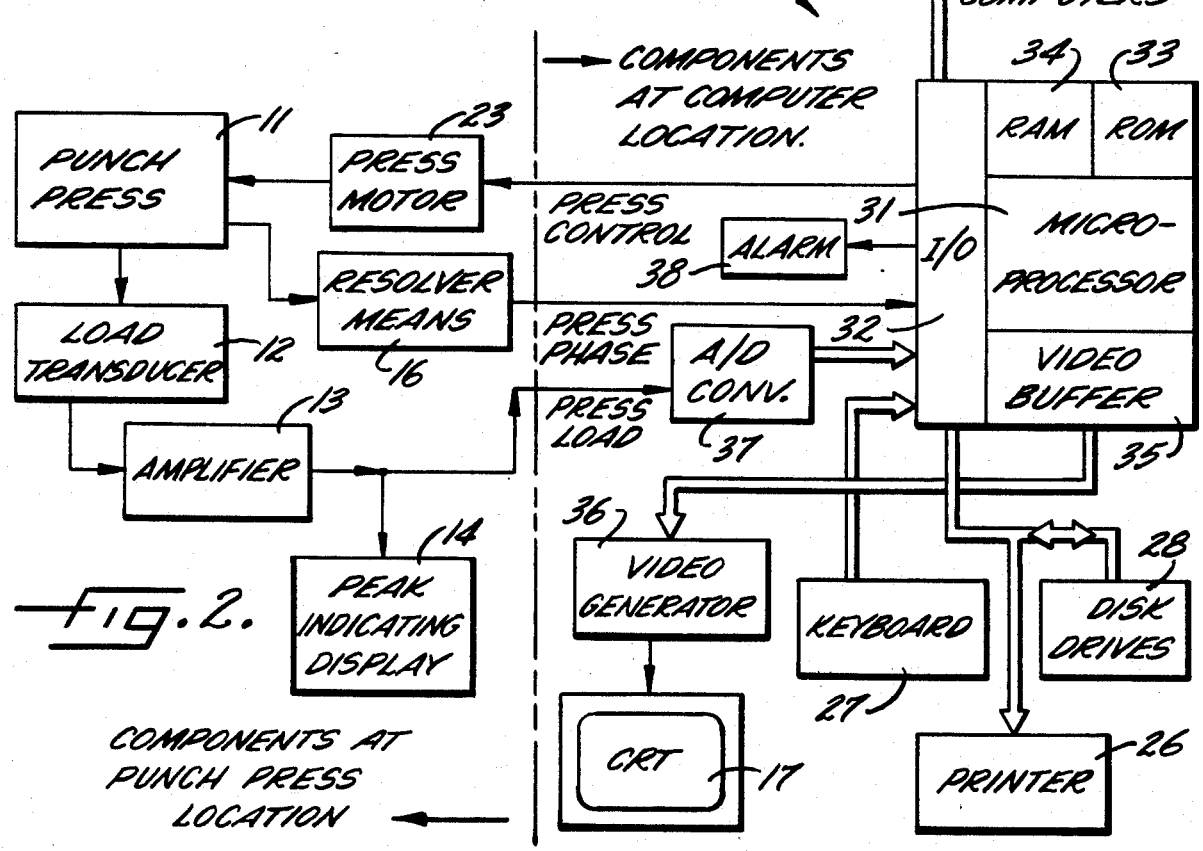
FIG. 2 is a block diagram of the hardware comprising the exemplary embodiment of the invention shown in FIG. 1.

Shown in FIG. 2 is a block diagram of the hardware pictorially represented in FIG. 1. It is evident that the microcomputer 15 is a standard off-the-shelf or OEM item having the conventional components of a microprocessor 31, an input/output port 32, read-only memory or ROM 33, random access memory or RAM 34, and an addressable video buffer 35. The video buffer 35 is direct memory accessed by a video generator 36 which interprets data bytes in the video buffer 35 as alphanumeric or graphic characters and displays the characters on the face of the cathode ray tube 18'. The read-only memory 33 contains a conventional operating system including a system program for loading the software portion of the load monitoring system into the microcomputer 15. The software portion of the load monitoring system is prerecorded on a flexible disk which is inserted into one of the disk drives 28 for reading by the microcomputer 15 in the conventional fashion. The microcomputer 15 also includes a conventional analog-to-digital converter 37 which periodically samples the press load signal from the amplifier 13 and converts the press load signal to a time series of numerical load values which are read into the microcomputer 15 through the input/output port 32. The microcomputer 15 further includes a standard alarm or tone generator 38 used for directing the operator's attention to fault or warning conditions sensed by the load monitoring system.

Figure 3:
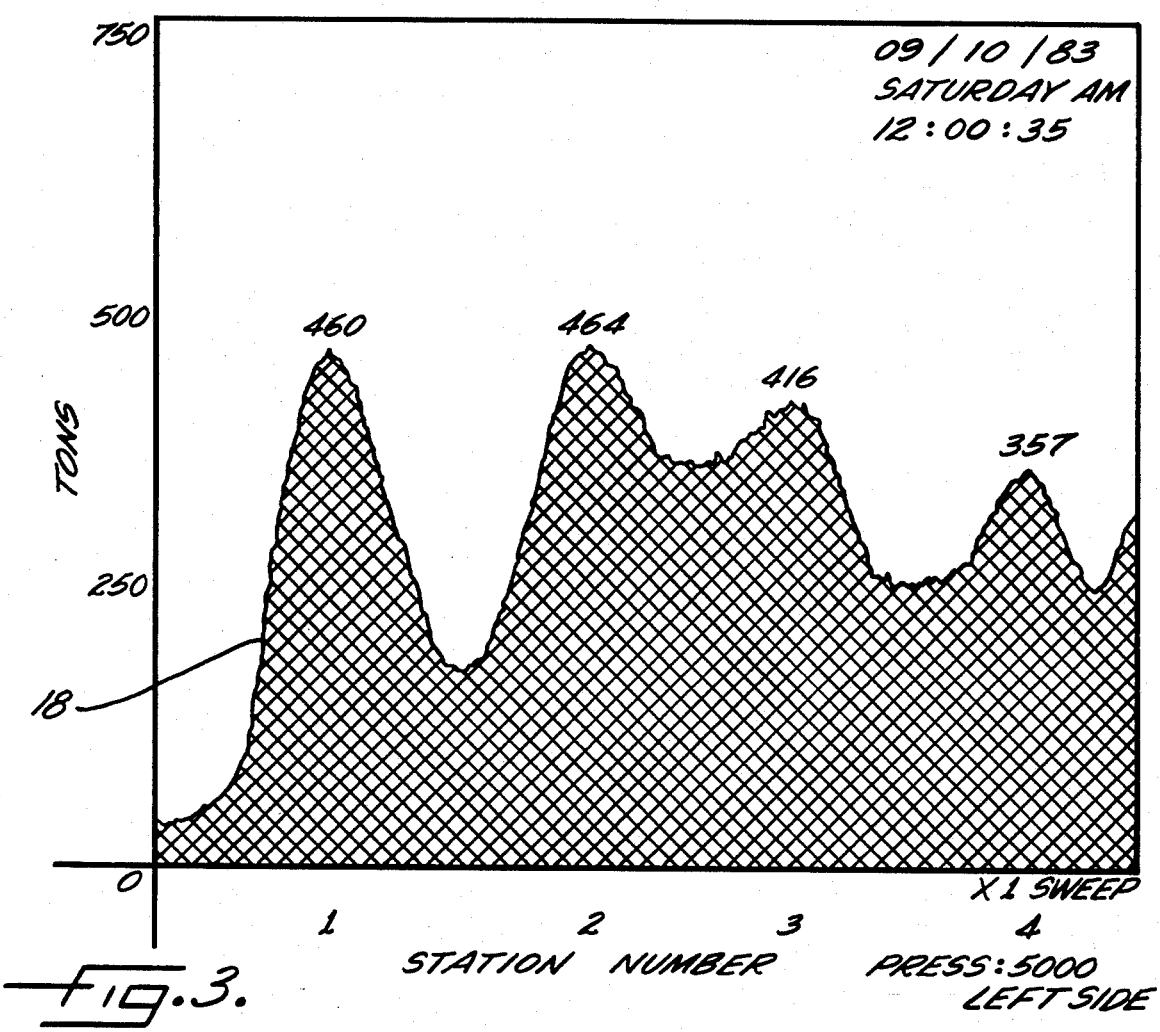
FIG. 3 is a drawing illustrating the preferred form of graphical display for the punch press load data gathered by the system as shown in FIG. 1.

Shown in FIG. 3 is a detail of the graph 18 displayed on the cathode ray tube 18' or generated in hard copy 26 by the printer 25. The day, date and time are displayed in the upper right-hand corner of the graph. The graph 18 has four peaks, each peak corresponding to a die station 21 in the electrical or time sequence in which the particular die stations 21 become active. The peaks are labeled by the microcomputer 15 with the respective peak values in tons, and the abscissa is labeled with both the electrical or time (E) and the mechanical or physical (M) sequence of the die stations 21. The particular staggering between the electrical (E) and the mechanical (M) sequence is prestored in the computer for each set of dies. Thus, the first peak 460 corresponds to the peak value in tons of the load registered by the leftmost die station 21, the second peak 464 corresponds to the right-of-center die station 21, the third peak labeled 416 corresponds to the left-of-center die station 21, and the peak labeled 357 corresponds to the peak load impressed on the rightmost or fourth die station. The load axis, labeled TONS, is also annotated with a convenient scale in tons, including tick marks at 250 tons, 500 tons and 750 tons.

It should be noted that the positions of the electrical and mechanical station numbers are automatically adjusted to fall beneath the peaks of the graph 18. On the lower right of the abscissa is the annotation "X 1 SWEEP" which denotes that an entire half cycle or downward stroke of the piston or ram 22 is being displayed. The operator has the option of entering at the keyboard 27 a request to display a 0.5 sweep, a times 2 sweep, a times 4 sweep and a times 10 sweep to display a full load cycle, a quarter load cycle, an eighth load cycle, or a twentieth of the load cycle instead of just a half load cycle as shown in FIG. 3. Below the station numbers on the abscissa and to the right is a designation of a press number and further there is an annotation "LEFT SIDE" which indicates that the load monitoring system which generated the graph 18 in FIG. 3 has not one but two load transducers 12 at the left and the right sides of the pitman 10 of the press 11. The microcomputer 15 may use either an analog multiplexer (not shown) or a separate analog-to-digital converter 37 for each of the two load transducers 12 in such a case to monitor either the left or right load transducer or to monitor the average load.

In addition to a time graph 19 of the load as shown in FIG. 3, it is advantageous to present a statistical summary for the individual die stations so that the operator may obtain individual readings in synthesized analog form of the loads and thresholds for the individual die stations 21. For the four-station progressive dies 19, 20 shown in FIG. 1, it is advantageous to have a computer-generated or synthesized analog meter display for each of the four die stations at the four quadrants of the cathode ray tube 18'. In the upper left quadrant, for example, the synthesized analog meter 45 for the die station No. 1 is generated as shown in FIG. 4.

Figure 4:
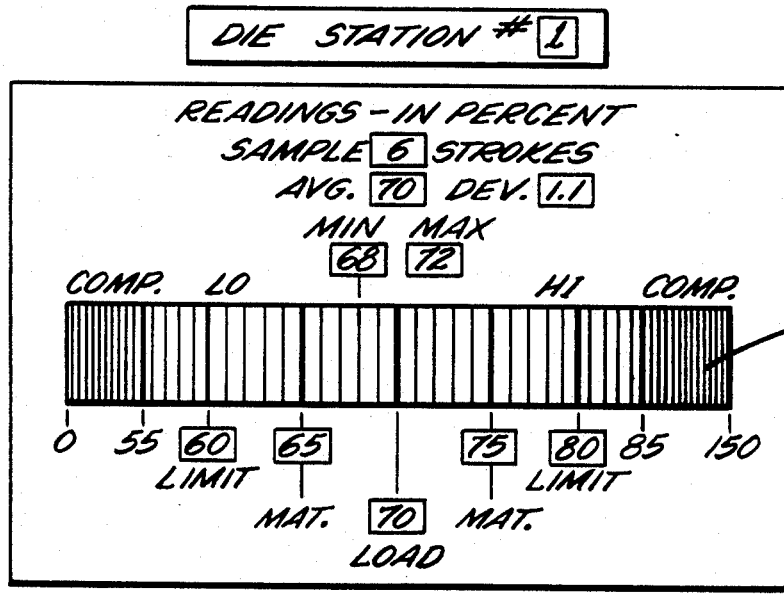
FIG. 4 is a drawing of a format for the presentation of load data and statistics for the individual die stations.

The numerical values enclosed in rectangles in FIG. 4 are variables that are adjusted by the microcomputer 15 after the templates or background graphics for the analog meters are transferred from RAM 34 to the video buffer 35 for each of the four die stations 21. The analog meter 45 is graduated in terms of percent of the maximum rated peak load for the press 11 so that the same graphics template may be used for presses 11 of various sizes and ratings. The synthesized analog meter 45, for example, presents a statistical summary for six strokes or cycles of the press 11 during which an average of 70 percent load was registered for the peak loads at die station No. 1. Over the six samples a standard deviation of 1.1% maximum rated load was measured.

The limit or set point values are displayed on the bottom of the synthesized analog meter 45. The expected peak load is 70%. The maximum threshold or high limit is 80% and the minimum threshold or low limit is 60%. If, for example, the peak load of the die station No. 1 exceeds 80% or falls below 60%, then the press motor 23 is turned off. Also indicated are high and low material thresholds of 75% and 65%, respectively. The press motor 23 is turned off if the average of any three successive peak loads for the die station No. 1 exceed the high material threshold of 75% or fall below the low material threshold of 65%. It should be noted that these set points or thresholds are initially pre-programmed to default values and may be adjusted by the operator through the keyboard 27 of the microcomputer 15. Preferably, the thresholds are periodically updated in proportion to the load value which is an average of successive ones of the peak loads. The load value is a long term average which slowly changes corresponding to normal die wear, and which is further constrained to be below a predetermined maximum limit such as the maximum rating of the press or 100%

As shown in FIG. 5, the microcomputer 15 is also programmed to generate a tabular summary of the load data and set points for the press 11. The first column of the table lists the electrical die station numbers in numerical order. A companion column could be provided to list the corresponding mechanical die station numbers. The second column is an initial die load which is the peak load, for each die station, that was measured when the die was first put into service. The current die load, labeled "TODAYS DIE LOAD" is, of course much greater than the initial die load due to the progressive wearing of the die as the die is used. The fourth column, labeled "PERCENT LOAD CHANGE", is merely the percentage of the difference between the current die load and the initial die load as a fraction of the initial die load. The fifth column, labeled "INITIAL % LIMIT SET", denotes the deviation of the high and low limits from the current die load in the second col umn labeled "TODAYS DIE LOAD". Thus, the "INITIAL & LIMIT SET" in the fifth column is ten percent and the "MAT'RL % LIMIT SET" in the sixth column is five percent. Additional columns explicitly stating the high and low load limits could also be provided. The seventh column indicates that at least one of the percentage limits was exceeded for each of the die stations. Additional columns could be provided to indicate separately the respective number of times that the initial % limits and the material % limits were exceeded. The eighth through eleventh columns summarize historical data determined by operator inspection of the dies after the press is stopped in response to a peak load being out of range. The eighth column shows that none of the tooling was damaged when the percent loads were exceeded. The percent loads, for example, were probably exceeded due to loading of the lower die 20 with punched metal. The ninth column indicates that the "TOOL TOP STATION" referring to the top die 19 was not damaged, and similarly the tenth column indicates that the "TOOL BOTTOM STATION" or lower die 20 was not damaged. The eleventh column summarizes the fact that the tooling was not damaged any number of times. The final column shows the die station ratings which establish absolute limits for the die loads.

FIG. 5 summarized the conditions of the dies 19 and 20. This information is transmitted via the link 24 to the production control computer (not shown). The production control computer keeps track of the condition of numerous presses and dies. The production control computer, for example, generates the summary shown in FIG. 6 which includes data on the press and die loading and graphic layouts of the dies. The various presses are identified by press numbers in the first column of the table in FIG. 6. Press 1000, for example, has two die stations, press 2000 is a single point press having a single die station, press 3000 has three die stations in line, and press 4000 has four die stations arranged rectangularly on the dies. Of particular importance is the comparison of the press tonnage loading in the sixth column to the press tonnage rating in the eighth column. Press 1000, for example, experienced a 10% overload in its right station, suggesting that its dies may have been damaged.

A press monitoring and control system according to the invention has been described generally and in terms of the functions performed and results accomplished. In addition to the known hardware described in FIGS. 1 and 2, the press control system uses interface components and software specially designed for the load monitoring system. Since the data analysis functions are performed by the microcomputer 15, many of the analog circuits previously used for controlling the press 11 are unnecessary. All that is required are interface components to supply a press phase signal and a press load signal to the microcomputer 15.

An interface for generating a press phase signal is shown in FIG. 7. The cam switch generally designated 16 has a pair of contacts 51, 52 that are opened and closed by a cam 53 on a cam shaft 54 driven in synchronism with rotation of the press crank shaft 17 (FIG. 1). The opening and closing of the contacts 51, 52 is sensed by interruption of current from a plus bias supply $+V_b$ through a load resistor 55 into a negative voltage supply $-V_b$. The interruption of the current creates a voltage signal at an input node 56. For input protection the voltage on the input node 56 is clamped to within approximately $+V_b$ and $-V_b$ by a pair of diodes 57, 58.

For noise rejection the voltage signal on the input node 56 is filtered by a low-pass filter comprising a series resistor 59 and shunt capacitor 60. The filtered signal on the capacitor 60 is then converted to a digital signal by a Schmitt trigger comprised of an operational amplifier 70, and input resistor 71, and a positive feedback resistor 72. The output of the Schmitt trigger 70 is the press phase signal fed to the microcomputer 15.

The load transducer generally designated 12 and the amplifier generally designated 13 are shown in FIG. 8. The transducer 12 includes a piezoelectric ceramic crystal 75 positioned between a top terminal block 76 and a bottom terminal block 77, the top and bottom faces of the crystal 75 being in contact with and against the surface of each of the respective terminal blocks.

The terminal blocks 76, 77 and crystal 75 in this case are surrounded by a metallic sheet 78 which serves as a magnetic and electric shield. The sheet 78 is slightly larger than the terminal blocks and crystal to provide space for a surrounding layer 79 of an encapsulating and insulating plastic material. Leading from the terminal blocks 76, 77 through the insulating layer 79 and the metallic sheet 78 are terminals 80, 81 with suitable connections for attachment of leads 82, 83. The terminals 80, 81 and hence the terminal blocks 76, 77 are electrically insulated from the sheet 78 at the passageway therethrough by terminal insulators 84. The sheet 78 is grounded to a shield 85 surrounding the leads 82, 83 by suitable connections, not shown.

The transducer 12 preferably is mounted on the press member 10 so that a line normal to the crystal faces at the interfaces between the crystal 75 and the terminal blocks 76, 77 is parallel to and aligned with the stress to be measured in the pitman 10 when under load during a working cycle. The transducer 12 is supported between two points in spaced relation to the pitman 10 to provide what may be characterized as a parallel mechanical circuit for shunting a small portion of the stress in the pitman member 10 to the transducer 12. The transducer in this case is clamped between the ends of two brackets 86, 87 that are screwed into the member 10. Then the ends of the brackets 86, 87 between which the transducer 12 is clamped are provided with balls 88, 89 and sockets in the terminal blocks 76, 77, respectively. The brackets preferably are electrically insulated from the terminal blocks by the balls 88, 89 which may be of a refractory insulating material.

In order to permit desired prestressing of the transducer crystal 75, a set screw 90 is provided in the end of the top bracket 86. After the transducer 12 is in position, the set screw 90 is screwed to secure the transducer under a clamping pressure that places the crystal 75 in a prestressed condition. The amount to which the crystal is prestressed must be sufficient so that it is in a stressed condition under all conditions of loading on the member 10. In such condition, during the working cycle of the press, the resulting changes in stress in the pitman 10 will act upon the transducer through its support bracketry 86, 87 and cause the piezoelectric 75 to produce relatively high voltage output signals proportional to the stress changes. More specifically, the piezoelectric 75 generates opposite polarity electrical charges on the terminal blocks 76, 77 proportional to the strain or deformation of the piezoelectric 75 and the area of the parallel crystal faces. Hence, periodic deformation of the piezoelectric 75 generates an alternating voltage having an amplitude proportional to the deformation of the piezoelectric 75 and the electrical capacitance between the two terminal blocks 76, 77. This capacitance includes the capacitance of an external variable capacitor 91 which may be trimmed to calibrate the gain of the transducer 12.

As was done with the interface circuit in FIG. 7, protection diodes 92, 93, 94 and 95 are used to ensure that the voltages on the leads 82 and 83 are constrained to within approximately the positive and negative bias voltages $+V_b$, $-V_b$. It should be noted that the difference in potential between the signal leads 82 and 83 indicates the load on the pitman 10. It is not, however, suitable for feeding directly to the microcomputer 15 due to the fact that the transducer 12 is a high impedance device and the signal voltage is dependent on the capacitance connected to the transducer 12. Hence, a buffer amplifier is required to isolate the transducer from the microcomputer 15 and also to provide a low impedance press load signal to the microcomputer 15. For this purpose a high input impedance operational amplifier 96 is used in a differential amplifier configuration having input resistors 97 and 98 of equal value and biasing resistors 99 and 100 of equal value. In order to suppress any high frequency interference that may be picked up on the leads 82, 83, for example from spurious radio frequency signals generated in the press room, the bandwidth of the amplifier 13 is limited by low pass filter capacitors 101 and 101' of equal value. The output of the operational amplifier 96 provides the desired low impedance press load output signal.

Although the circuit in FIG. 8 as already described is all that is necessary for use in the load monitoring and control system according to the invention, it is desirable to assure operators familiar with prior art systems that a transducer signal is in fact being transmitted to the microcomputer 15 for automatic shut down of the press 11 under excessive load conditions. For this purpose the amplifier 13 includes a peak reading meter circuit. A conventional peak detector is used comprised of an operational amplifier 102 having a positive input receiving the press load signal, a charge holding capacitor 103 connected to the negative input of the operational amplifier 102, and a directional diode 104 having its cathode connected to the capacitor 103 and its anode connected to the output of the operational amplifier 102. The capacitor 103, in other words, is charged up to the peak value of the press load signal through the diode 104. It is presumed that the operational amplifier 102 has output current limiting at a reasonably low current level. Otherwise, a current limiting resistor should be inserted in series with the directional diode 104. In order to establish a time constant during which the peak value stored on the capacitor 103 decays, a resistor 105 is placed in parallel with the capacitor 103. In order to drive the peak indicating display 14 which is a milliammeter, a third operational amplifier 106 is used in follower configuration to provide a buffered voltage signal for driving the milliammeter 14 through a current setting resistor 107 and a trimmed meter calibration resistor 108, the current through the resistors 107, 108 being proportional to the voltage generated at the output of the operational amplifier 106.

The microcomputer 15 executes a load monitoring and control program read from a flexible disk inserted in one of the disk drives 28. This load monitoring and control program in effect reconfigures the microcomputer 15 to perform a number of functions as indicated in the block diagram of FIG. 9. The press phase signal is received on a phase equals zero detector 110 which generates a sweep trigger signal in response to the press phase signal. The phase equals zero detector is a means for generating a sweep trigger signal at a predetermined phase indicated by the resolver means. For the press phase signal generated by the interface in FIG. 7, the phase equals zero detector is an edge detector responsive to either the leading or trailing edge of the press phase signal corresponding to the precise time when the switch 16 opens or closes. The phase equals zero detector 110 is conveniently embodied as an edge sensitive interrupt input which interrupts the microcomputer upon a leading or trailing edge of the press phase signal.

A speed determining means 111 calculates the time between two successive sweep trigger signals and also scales that time by user scaling input 112, for example, from the keyboard 27 in FIG. 1. This scaled time between sweep trigger signals is proportionally adjusted to determine a sampling time. Upon a sweep trigger signal, an array loading means 113 successively reads the output of the analog-to-digital converter 37 generating numerical values representing the press load signal. The time period between successive reads of the analog-to-digital converter 37 is the sampling interval provided by the speed determining means 111. The numerical values read by the array loading means are transferred to successive locations of a load array random access memory portion 114. Characterized broadly, the array loading means 113 comprise means for loading a predetermined amount of random access memory with numerical load values generated at periodic intervals, the period being a predetermined fraction of the time between successive sweep trigger signals. The load array random access memory holds 420 sample values, although a greater or lesser fixed number of samples per cycle could be stored to provide a greater or lesser precision of measurement. The array loading means 113 counts the number of sample values being loaded into the load array random access memory 114, and once the 420th value is loaded, the array loading means 113 generates an array loaded signal.

The array loaded signal is fed to a load graphing means 115 to trigger the transfer of data from the load array RAM 114 to the video buffer 35. The load graphing means, for example, successively receives the ordered values from the load array RAM 114 and depending on the individual values, generates the graph 18 on the display or cathode ray tube 18'. It should be noted that the load graphing means is a standard kind of software program or subroutine and such programs are staple items of trade for particular microcomputers 15. The load graphing means 115 also receives the user's scaling input 112 so that the sweep scale factor may be written just below the abscissa on the graph 18.

Also in response to the array loading signal, a peak finding means 116 searches for and finds peak values indicating the presence of die stations 21 in the dies 19, 20 on the press 11. The actual method performed by the peak finding means is discussed in detail below. But the result of the peak finding means is, for each sweep trigger signal, the number of peaks found, and the peak load and time location or time index for each peak found. The time index identifies the peak as a particular one of the 420 ordered values in the load array RAM 114. These data are fed to a graph annotating means 11 which labels the peaks on the graph 118 in terms of th respective peak values and also writes the electrical an mechanical die station numbers just below the absciss and aligned vertically with the peaks.

The data generated by the peak finding means 116 are also fed to a peak array random access memory portion 118 for temporary storage so that the peak values for prior sweeps or load cycles are available for analysis along with the current data from the peak finding means. The analysis is performed, for example, by peak analyzer means 119 which generates averages and deviations as shown in FIG. 4 and also compares peak values to the predetermined thresholds or limits shown in FIG. 4. The statistical data and threshold values are fed to a statistics display generator 120 which generates the diagram shown in FIG. 4 and FIG. 5. The peak analyzer 119 also generates press control signals and activates an alarm 121 whenever the peak value substantially deviates from the predetermined or expected load value, so that the press 11 is shut off and the operator is alerted. Data are also generated by the peak analyzer 119 to generate summary data stored by the recording means or disk drives 28 on flexible disks. This summary data is also fed to accounting and production control computers over the link 24.

The operator may select to view either the load graph as shown in FIG. 3 or compiled data and statistics as shown in FIG. 4 and FIG. 5 through user report selecting means 122 such as the keyboard 27 for entering operator choices. The operator may also select a hard copy of the display on the cathode ray tube 18' by activating a printer plotting means 123 to transfer data from the video buffer 35 to the printer 25. It should be noted that the printer plotting means 123 is, for example, a standard software package that is a staple item of commerce for many kinds of microcomputers.

Figure 10:
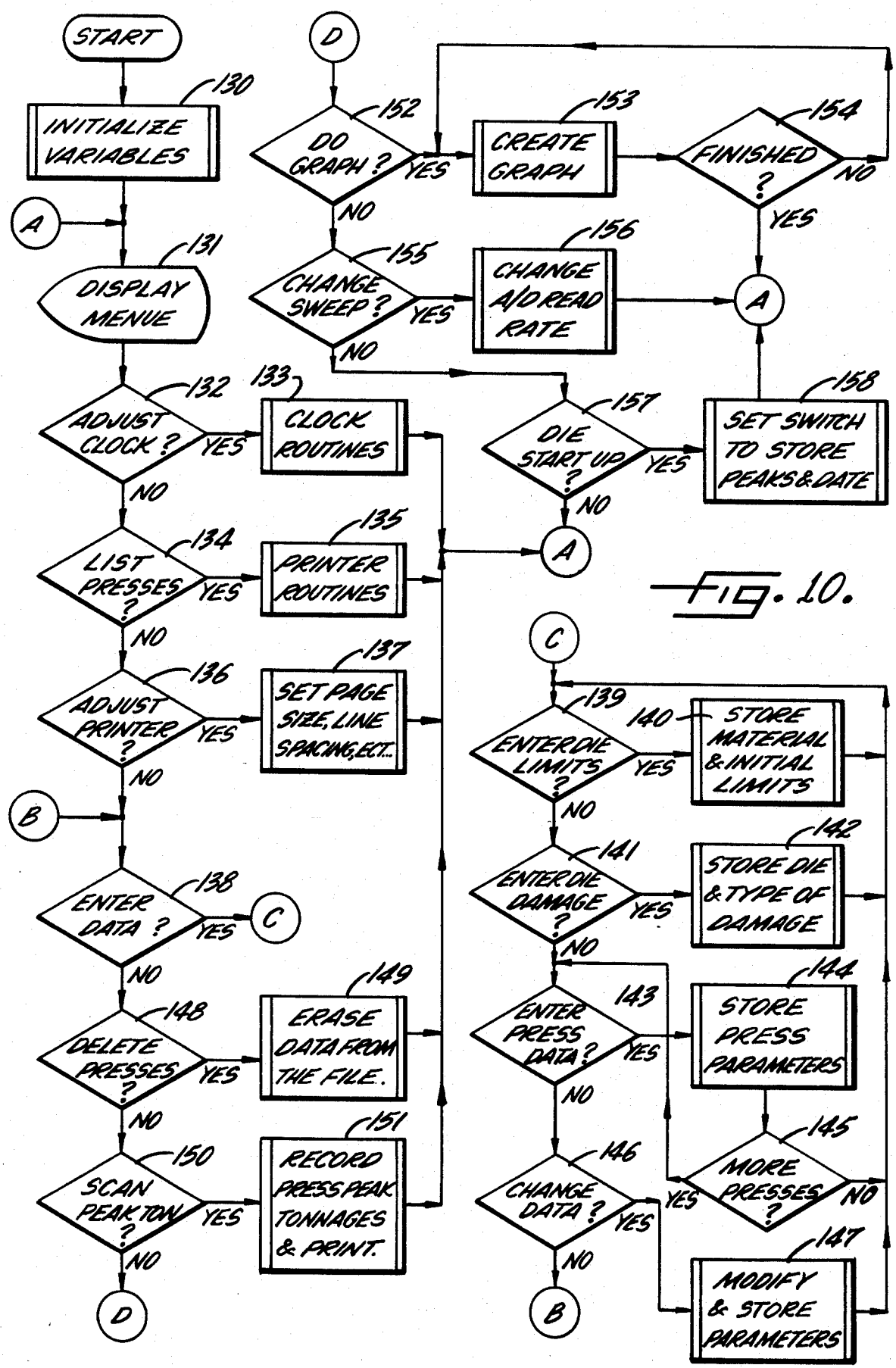
FIG. 10 is a flowchart of an executive program for the microcomputer in a load monitoring system of FIG. 1.

Turning now to FIG. 10, there is shown a flowchart of an executive program for the microcomputer 15 in the load monitoring system of FIG. 1. In the first step 130, all of the variables for the executive program are set to initial or default values. Then in step 131, a menu is displayed showing the operator the various options for changing the default values and entering press data. The executive program then proceeds to respond to any operator requests by testing for an operator command and then calling a subroutine to change the indicated default values or to perform a desired function. In step 132, for example, the executive program tests whether the operator selects an item to adjust the clock or scale factor with which the microcomputer 15 samples the press load signal to obtain the 420 ordered values in the load array. The adjustment is performed by clock routines 133 in response to data from the operator. The operator may list press data by making a selection recognized in step 134. The listing is performed by printer routines in step 135. The operator may also enter a command recognized in step 136 so that a routine in step 137 adjusts the page size, line spacing and other printer parameters.

In step 138 the operator is given a wide selection of choices for data entry. Operator entry of die limits is recognized in step 139 and the initial die limits and material parameters are stored by a subroutine in step 140. The operator may enter die damage data for recording purposes which is recognized in step 141 and stored in step 142. The entry of press data is recognized in step 143 and the press parameters are stored by a subroutine in step 144. The operator is prompted in step 145 for the entry of data for more presses. An operator command to change data is recognized in step 146 and parameters are modified and stored by a subroutine in step 147. After data is entered, execution jumps back to step 138 to recognize an operator request for further entry of data.

If a press is removed from the system, the system recognizes an operator request to delete a press in step 148 and data for this press are erased from random access memory (34 FIG. 2) by a subroutine in step 149.

Aside from the adjustment and set-up functions performed by the executive program in response to operator commands, the executive program receives requests to analyze press load data and to generate load graphs and tables. An operator request to scan the press load signal is recognized in step 150 and the load data for a scan, in terms of the press peak loads, are recorded and printed by a subroutine in step 151. An operator request to generate a graph is recognized in step 152 and a graph is created in step 153. Preferably the graph is generated in multiple steps with different options being provided to the operator. The graph is not finished as tested in step 154, until all of the options selected by the operator are satisfied. The operator is specifically given the option of changing the sweep or scale factor of the graph or data sampling in step 155 and the required change in the analog-to-digital converter read rate and data storage rate is performed by a subroutine in step 156. The operator may request the start up of a new die as tested in step 157 and the required storage of initial data is performed by a subroutine in step 158.

Execution of the executive program is repetitive and steps 131-158 are repeated by execution jumping back to step 131. The executive program, in other words, is always running whenever the press load monitoring system is turned on.

Figure 9:
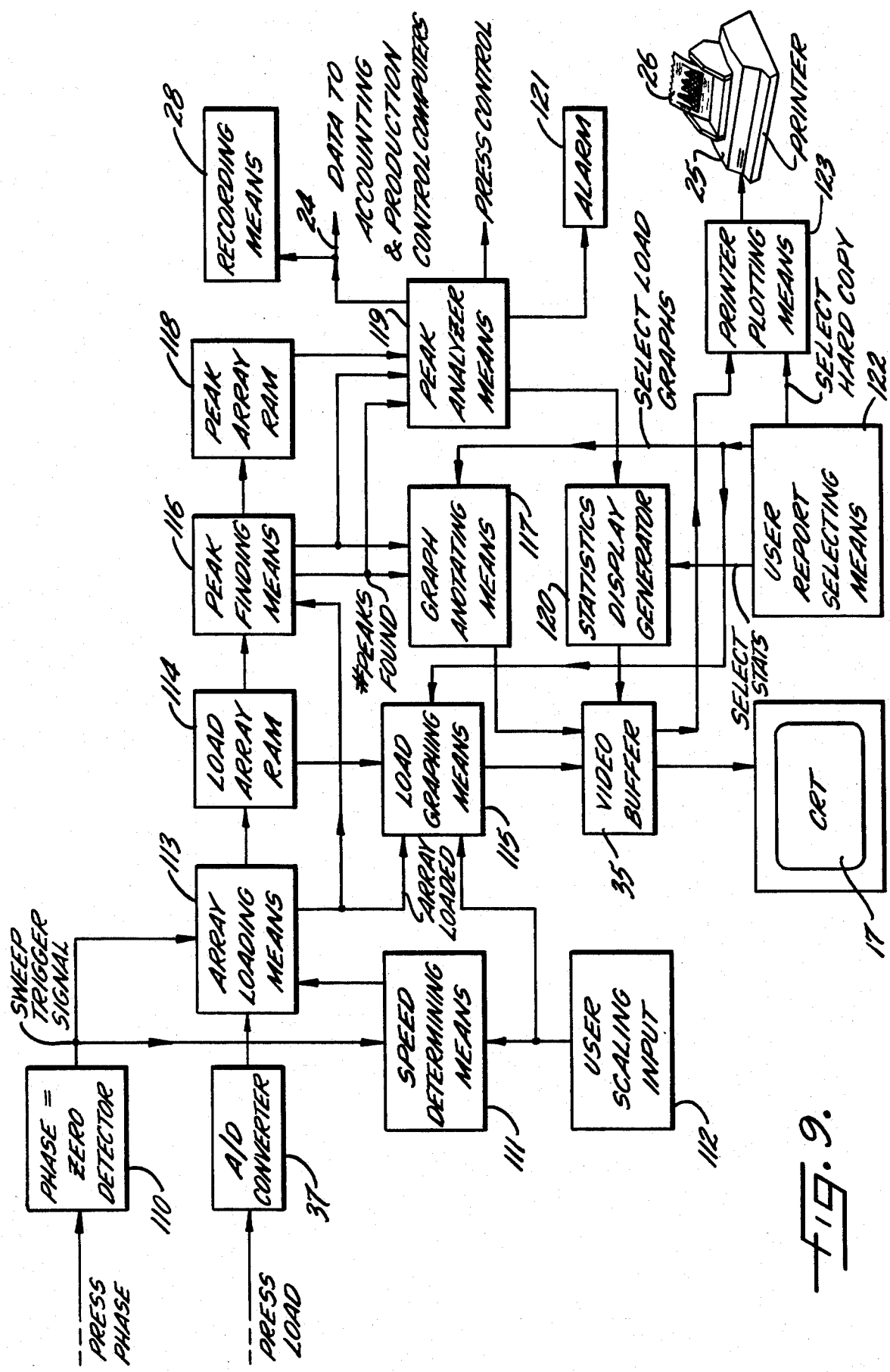
FIG. 9 is a functional block diagram of the control system shown in FIG. 1 including both the physical hardware and the software or programming for the microcomputer in the control system.
Figure 11:
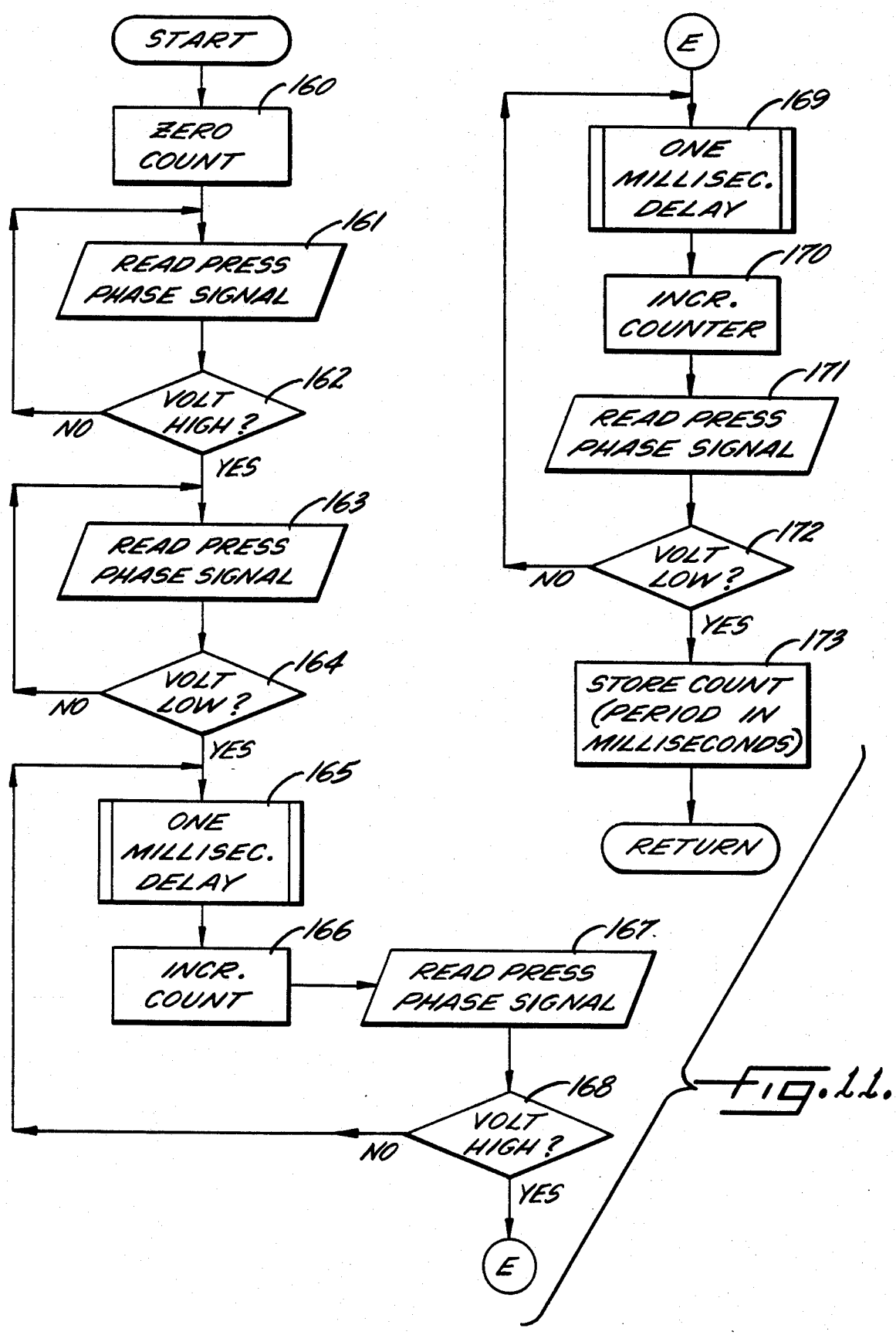
FIG. 11 is a flowchart of a speed determining subroutine programmed into the microcomputer of FIG. 1.

Turning now to FIG. 11, there is shown a flowchart of a speed determining subroutine which implements the speed determining means 111 in FIG. 9. The speed determining subroutine analyzes the press phase signal (FIG. 2) to determine the speed of operation of the punch press 11. The speed is determined by measuring the period of the press phase signal. The period is counted in terms of milliseconds in a memory location used as a counter. In the first step 160 the counter is cleared. In step 161 the press phase signal is read and in step 162 it is compared to a logic high level until a high level is detected. Once the press phase signal is in the initial high level a complete period is counted between the high-to-low transition, low-to-high transition, and final high-to-low transition.

To detect the high-to-low transition, the press phase signal is read in step 163 and compared to a logic low level in step 164. Once the logic low level is detected, counting in intervals of one millisecond is performed by a one millisecond delay in step 165 and an increment counter step 166. The press phase signal is again read in step 167 in order to test for a logic high in step 168 to determine when the low-to-high transition occurs. Then the time in milliseconds during which the press phase signal is high is counted by performing a one millisecond delay step 169 and an increment counter step 170. The press phase signal is again read in step 171 and compared to a logic low in step 172 to detect the final high-to-low transition. After this final high-to-low transition, the value of the count is the period of the press phase signal in milliseconds. Therefore, in the final step 173 the value of the count is stored for use, for example, by the array loading means 113 in FIG. 9.

Figure 12:
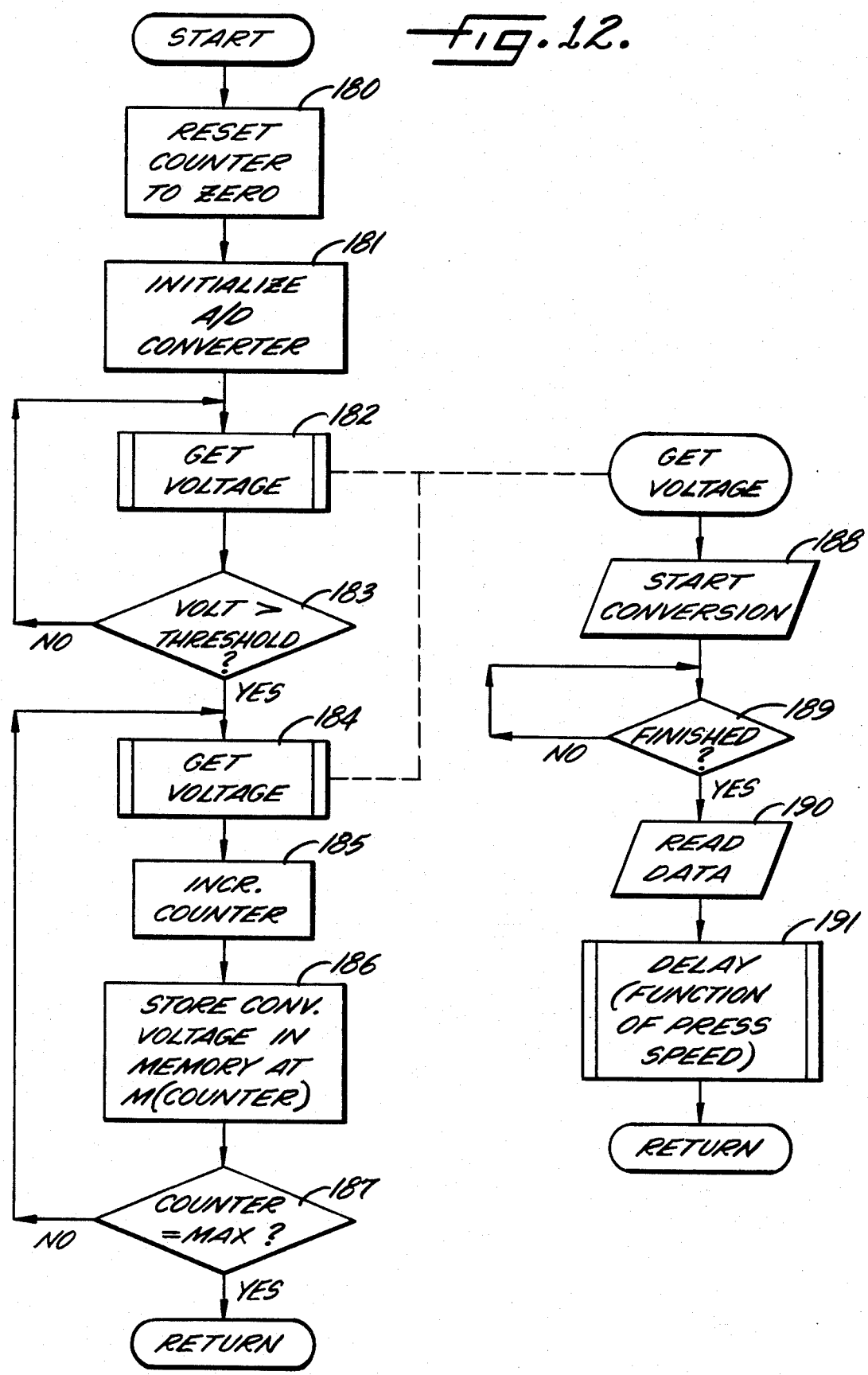
FIG. 12 is a flowchart of a data acquisition subroutine programmed into the microcomputer.

Turning now to FIG. 12, there is shown a flowchart of a data acquisition subroutine which implements the array loading means 113 in FIG. 9. In the first step 180, a counter that is used as a memory array index is set to zero. Then in step 181 the analog-to-digital converter 37 (in FIG. 2) is initialized in order to successively generate numerical values of the press load signal that are read into the microcomputer 15 by a "get voltage" subroutine in step 182. These values, however, are not stored until the voltage of the press load signal exceeds a threshold as determined in step 183. In other words, the sampling and data storage of the press load signal by the microcomputer 15 is triggered by the press load signal exceeding a predetermining threshold voltage. Once this voltage threshold is exceeded, numerical values from the analog-to-digital converter 37 are successively and iteratively obtained in step 184, the counter or memory pointer is incremented in step 185, and the numerical value of the voltage is stored in memory indexed on the value of the counter in step 186. This iterative process continues until the value of the counter is equal to a maximum value as tested in step 187. For the exemplary embodiment having 420 points, as discussed above, the maximum value is 420.

The get voltage subroutine called in step 182 and 184 results, for each subroutine call, in a series of steps starting with step 188. In step 188, the microprocessor 35 (FIG. 2) reads a handshaking signal from the analog-to-digital converter 37 and then tests the signal in step 189 to determine if a new numerical value has been sampled by the analog-to-digital converter. Once the sampling is completed, the value is read by the microcomputer in step 190. Finally, in step 191 the microcomputer waits for a delay time that is a function of the press speed as determined by the speed determining subroutine in FIG. 11. The delay in step 191, in other words, ensures that the press load signal is periodically sampled over a relatively constant angular or phase range of the crank shaft 17 of the punch press 11 (FIG. 1). The result is that periodic samples over the phase range are stored in a memory array.

Figure 13:
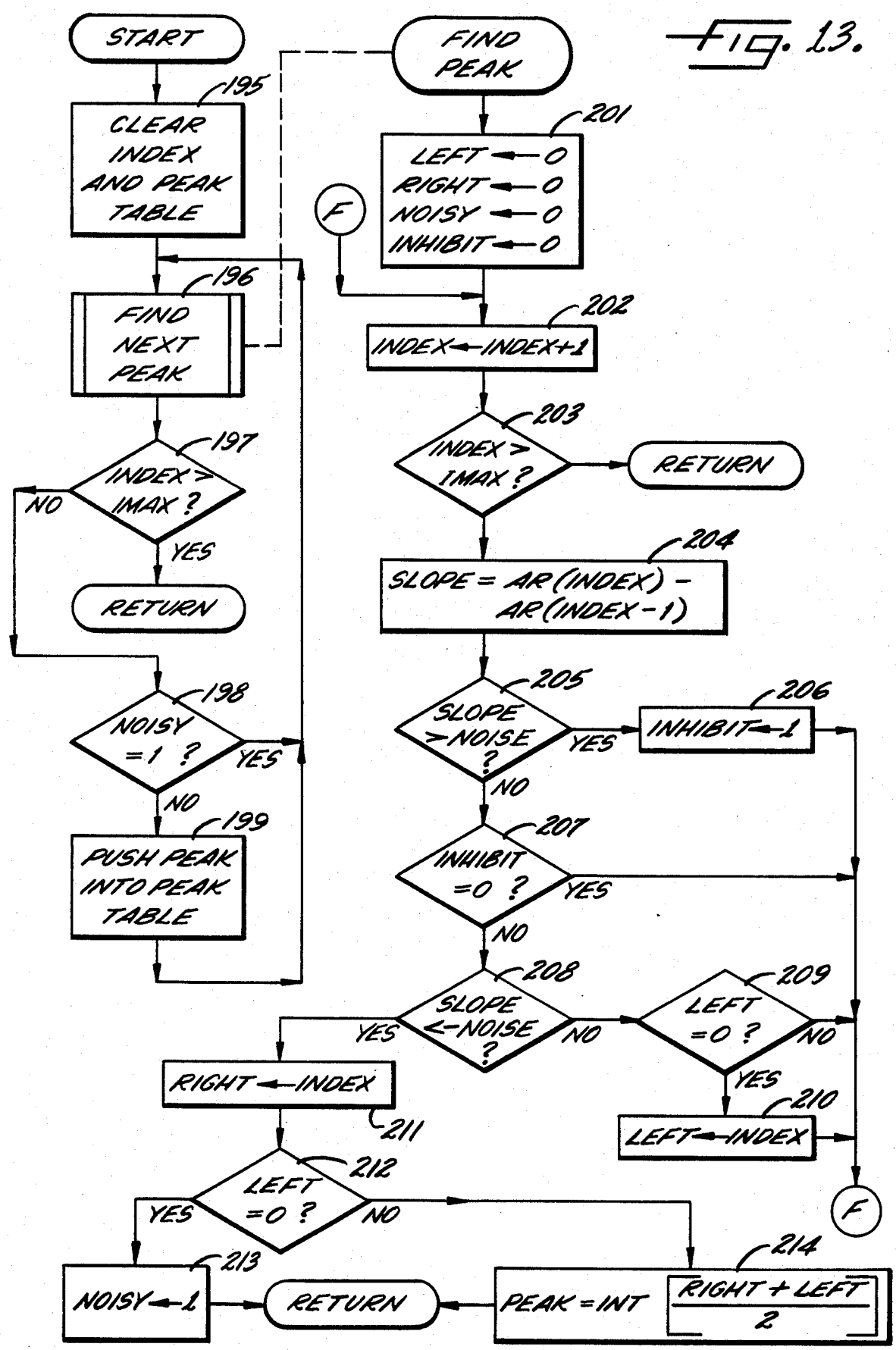
FIG. 13 is a flowchart of a peak finding subroutine programmed into the microcomputer.

Turning now to FIG. 13 there is shown a flowchart of a peak finding subroutine which embodies the peak finding means 116 in FIG. 9. In the first step 195, an index is cleared and a peak table is also cleared, for example, by clearing a stack pointer for the peak table. A subroutine which finds the individual peaks is called in step 196. Execution returns from the subroutine call in step 196 by either the exhaustion of data, the identification of a noise peak, or the finding of a single load peak and its associated memory array index value. The index is tested in step 197 against a maximum value IMAX to determine whether data is exhausted. If the index exceeds the maximum IMAX, then execution of the subroutine in FIG. 13 is finished. If not, then in step 198 a noise flag NOISY is tested, a noise peak being indicated if the noise flag is equal to one. If a noise peak has been found, execution jumps back to the subroutine in step 196 which searches for the next individual peak. Otherwise, an individual load peak has been found so that in step 199 the index value of the peak (represented by the variable PEAK) may be loaded into the peak table.

The subroutine 196 which finds individual peaks starts with step 201 which clears a number of flags including a flag LEFT denoting a left breakpoint of the maximum, a flag RIGHT denoting the right breakpoint of the maximum, a flag NOISY indicating whether a noise peak is found, and a flag INHIBIT denoting whether the load signal in the memory array has a substantial upward slope. In general terms, individual peaks are found by analyzing the slope of the load signal and finding the maximum when the slope is approximately zero. In pure mathematical terms, a maximum is found when the slope or derivative is exactly zero. But in practice, there will always be a small amount of noise in the load signal so that it is better to find breakpoints slightly to the left and right of the maxima. The left breakpoint is obtained by comparing the slope to a slightly positive threshold, and the right breakpoint is determined by comparing the slope to a slightly negative threshold having the same magnitude as the positive threshold. The magnitude of the threshold is denoted by the constant NOISE which is set slightly greater than the expected peak amplitude of the noise that is on the load signal. A typical peak in the load signal from a progressive die is characterized by a time sequence at first having a slope greater than the positive threshold, a slope that is between the positive and negative threshold, and then a slope that is less than the negative threshold. The time location or index of the detected peak is the average of the time or index of the left and right breakpoints. This procedure can also detect fast noise pulses, since for a fast noise pulse the slope will immediately change from a positive value greater than the positive threshold to a negative value less than the negative threshold.

In terms of a procedure to be executed by the microcomputer 15, (FIG. 1), in step 202 the index is incremented and in step 203 the index is compared to a predetermined maximum value IMAX in order to determine whether all of the periodically sampled load data in the memory array AR have been processed. If not, the slope is calculated in step 204 as the difference between adjacent sample points in the array AR. In step 205, the slope is compared to the positive noise threshold NOISE and if it is greater than the positive noise threshold the inhibit flag is turned off in step 206. The search for a maximum or peak, in other words, must start from the left side of the maximum where the slope is substantially positive. If, for example, the slope is at first substantially negative, then in step 207 the inhibit flag is tested and will be found to be equal to zero. If the inhibit flag is first set in step 206, or found to be equal to zero in step 207, the search for the peak for the particular value of the index terminates and execution proceeds to step 202 to increment the index. Otherwise, if the slope is not greater than the positive noise threshold as determined in step 205 and the inhibit flag is set to one as found in step 207, then in step 208 the slope is compared to the negative noise threshold. If the slope is no less than the negative noise threshold, then the index points to or is at a region of the load array AR at the relatively flat top of the peak. Thus, in step 209, the pointer LEFT is compared to zero and if it is zero the pointer LEFT is set in step 210 to the current value of the index. The combination of steps 209 and 210, in other words, determines the index of the left breakpoint for the maximum or peak. If, however, in step 208 the slope is found to be less than the negative noise threshold, then in step 211 the pointer RIGHT to the right breakpoint is set to the current value of the index. Note that there is no need to test whether the pointer RIGHT is initially equal to zero since execution will return to step 196 without the index being incremented in step 202.

In step 212 the value of the pointer to the left break point is compared to zero to determine whether a sharp noise pulse is detected. If the value of the pointer LEFT is equal to zero then it is evident that no flat portion of the maximum or peak has been detected so that the noise flag NOISY is set to one in step 213 and execution returns to step 196. If, however, in step 212 the pointer LEFT is not equal to zero then the peak value is calculated in step 214 as the average of the left and right pointers. This average, however, must be rounded to an integral value since the average is used as an index or pointer to a particular one of the periodically sampled values of the press load signal. The peak value, in other words, is the value stored in the array AR at the location specified by the index PEAK. Since this peak index has at last been found, execution returns to step 196.

Figure 14:
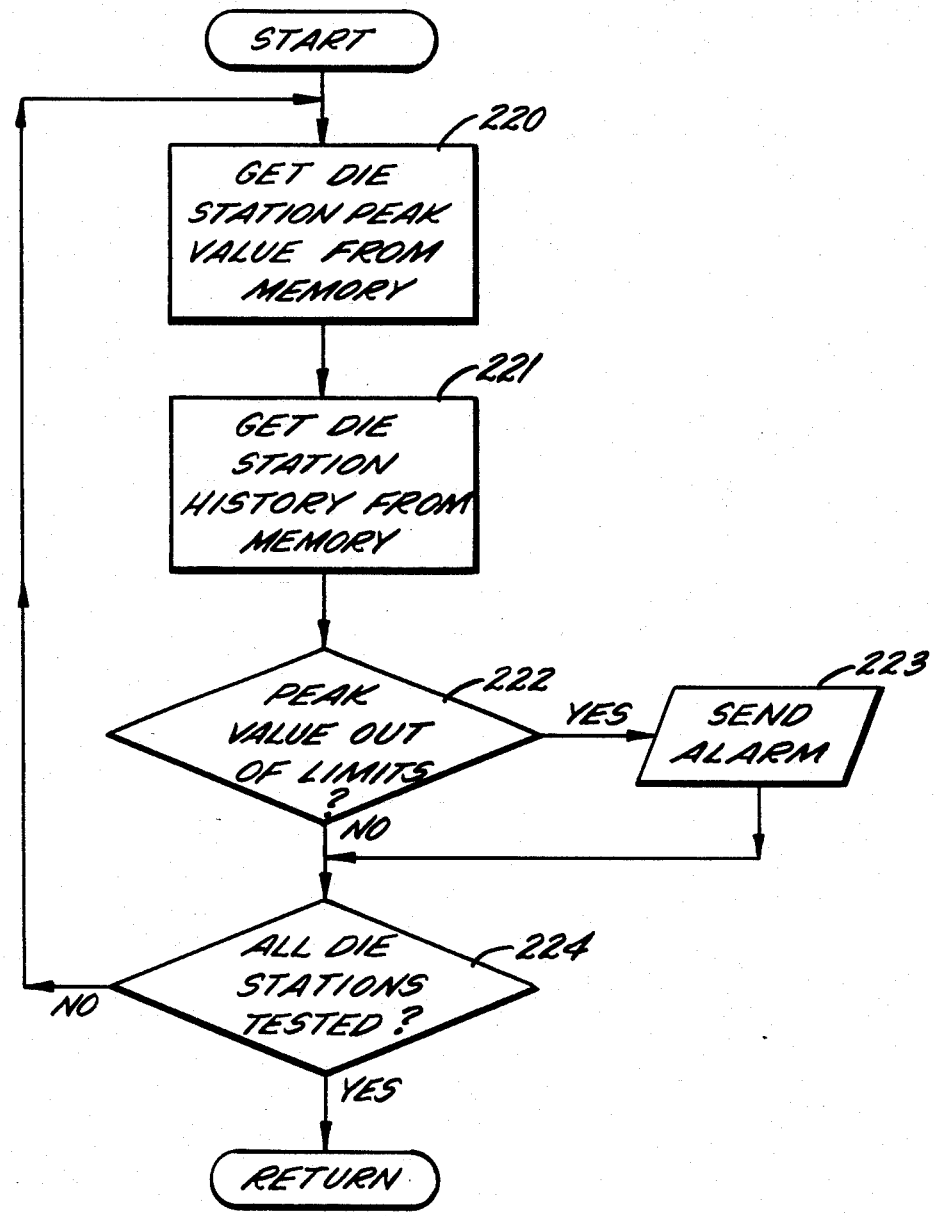
FIG. 14 is a flowchart of a peak analyzing subroutine for the microcomputer shown in FIG. 1.

Working in conjunction with the peak finding subroutine of FIG. 13 is a peak analyzing subroutine in FIG. 14 which compares the peak values to predetermined limits and by doing so monitors the individual die stations 21 (FIG. 1). In other words, the subroutine of FIG. 14 implements the peak analyzer means 119 in FIG. 9. In the first step 220 a die station peak value is obtained from memory by first looking up the index of the peak value in the peak table where the indices of the peaks were stored in step 199 of FIG. 13. By using this index, the peak load value is obtained from the load array RAM 114. The prior history of the respective die station is also obtained in step 221 from memory. In step 222 the peak value is compared to predetermined high and low limits or thresholds to determine whether the peak value is within the predetermined range. As was discussed above in connection with FIG. 4, averages of successive peak values are also compared to high and low material thresholds. If any of these thresholds are exceeded, then an alarm is generated in step 223. Preferably, a control signal is also generated to shut off the press 11 and a message is displayed identifying the current die station which is responsible for the abnormal peak load. In step 224 execution returns back to step 220 to get the next die station peak value from memory unless all of the die stations have been tested. If all of the die stations have been tested, then the peak analyzing subroutine of FIG. 14 is finished.

The load monitoring and control system as described above is triggered at a predetermined zero or reference phase and the sampling or digitizing of the press load signal is performed at a rate responsive to the speed of the press as determined by the interval between the zero phase reference points. The zero phase reference points, for example, are indicated by the closing or opening of a cam switch such as is shown in FIG. 7. For presses operating at high speed or at highly variable speeds, it is preferable to digitize the press load signal at precise phase points along each cycle of the press load signal. Digital sampling at precise phase points, for example, permits the use of waveform comparison between successive cycles even though the speed of the press is highly variable.

Turning now to FIG. 15 there is shown a precision resolver means 16' and associated circuitry for sampling or digitizing the press load signal at precise phase points along each cycle of the press load signal. The precision resolver means 16' uses an optically encoded transparent disk 230 mounted on a hub 231 securely fastened to the punch press crank shaft 17. The optical disk 230 is a disk of heavy photographic film having received the image of a plurality of light-dark graduations 232 disposed about its circumference and a single timing mark 233 defining a zero phase or reference position. To electrically sense the graduations 232 and the timing mark 233, these respective sets of marks are illuminated by respective light emitting diodes 234, 235 energized by the positive +Vb and negative −Vb supplies through load resistors 236, 237. On the opposite side of the disk 230 from the light emitting diodes 234, 235, there are aligned therewith respective phototransistors 238, 239. The light emitting diodes 234, 235, and phototransistors 238, 239 are fixedly mounted to the punch press. Thus, when the crank shaft 17 is rotated, the phototransistor 238 sensing the graduations 232 is alternately turned on and off at precise phase points. The phototransistor 239 sensing the timing mark 233, however, is turned on and off only at the zero or reference phase position in the press cycle.

To generate electrical signals in response to the turning on and off of the phototransistors 238, 239, respective load resistors 240, 241 are provided for the phototransistors. The collector voltages of the phototransistors 238, 239 are converted to binary press phase signals by respective Schmitt triggers 242, 243 including respective comparators 244, 245, positive feedback resistors 246, 247, and series input resistors 248, 249. In order to convey these binary press phase signals over a shielded cable 250 to the microcomputer 15, respective line driver amplifiers 251, 252 are provided.

In order to digitize the press load signal at the precise phase points indicated by the precision resolver means 16', the analog-to-digital converter 37 is configured as a tracking converter, and the output of the tracking converter is sampled by a register 253 at the precise phase points. The tracking analog-to-digital converter 37 includes the conventional components of a high speed clock 254 clocking an up/down counter 255 providing a digital or numeric value fed to a digital-to-analog converter 256 generating a responsive analog reference value. The analog reference value is compared to the press load signal by a comparator 265. The comparator 265 generates the up/down signal specifying whether the counter 255 should count up or down so that the numeric value indicates the voltage of the press load signal.

So that the latch 253 is synchronized to the high speed clock 254 as well as the binary press phase signal from the precision resolver means 16', the binary press phase signals are synchronized by a latch 258 clocked by the high speed clock through an inverter 259. A third latch 260 samples and holds the zero or reference phase signal from the driver 252 over one period of the phase point indicating signal from the driver 251. The phase point indicating signal also clocks the latch 253 and is used as an interrupt input (CA1) to the input/output (I/O) circuits 32 of the microcomputer 15. The latch 253 supplies a numeric data input (Din) and the latch 260 supplies a reset (RESET) input which are read by the microcomputer 15 during each interrupt. During each interrupt, in other words, the microcomputer 15 receives the digitized or numeric value of the press load signal at a particular phase point indicated by the precision resolver means 16', and the phase point for the zero or reference phase position is separately indicated by the reset input.

Figure 16:
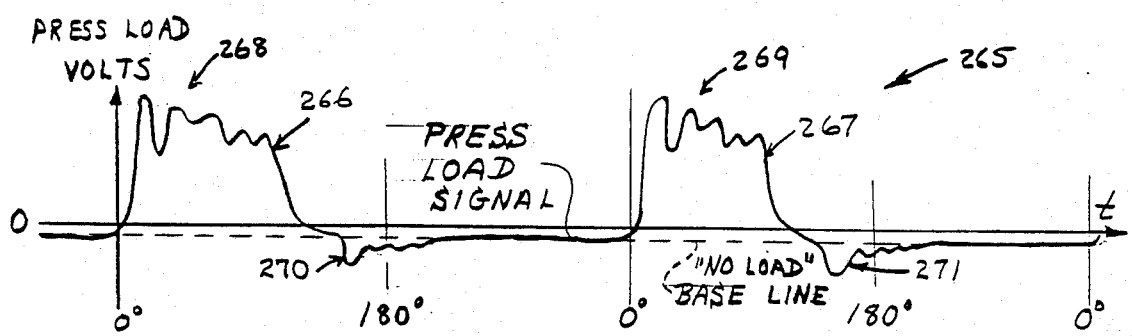
FIG. 16 is a pictorial drawing of a typical press load signal over two press cycles.

Turning to FIG. 16 there is shown a graph generally designated 265 of the press load signal including a first cycle 266 and a second cycle 267. In addition to the positive peaks 268 and 269 which were previously discussed in connection with FIG. 3, the press load signal 265 includes reverse loads generally designated 270 and 271. Also shown in FIG. 16 is a base line indicating a "no load" condition wherein the press member is neither in a state of compression or tension. The base line will be readily apparent when the particular press member being monitored is loaded only during a small fraction of the press load cycle. Then, the press load will be zero for a substantial part of the press load signal.

Figure 17:
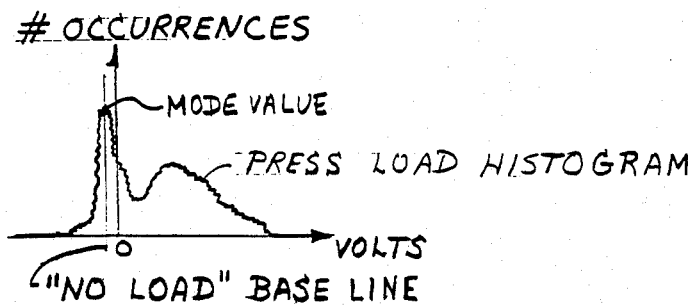
FIG. 17 is a histogram of the press load showing that the no-load baseline is obtained as the mode value.

To determine the base line or the voltage of the press load signal indicating the absence of load, the microcomputer 15 can calculate a histogram of the press load such as is shown in FIG. 17 and the maximum value of the histogram, called the "mode value", will occur at the base line voltage. Once the base line voltage is established, the microcomputer 15 can identify the reverse loads 270 and 271 (FIG. 16) and can accurately determine their magnitude. Excessive reverse loads, for example, may indicate improper sticking or binding between the male and female dies 19, 20 (FIG. 1).

In addition to performing statistical operations using the digitized values of the press load signal, the microcomputer 15 can perform a signature or waveform comparison between successive cycles of the press load signal. For a manual comparison between the first cycle 266 and the second cycle 267, the waveforms of the two cycles are overlayed as is shown in FIG. 18. The human eye can easily discern anomalous deviations between the two waveforms. Such anomalous deviations could indicate, for example, that the dies 19, 20 (FIG. 1) have just become chipped, cracked or otherwise damaged, or that defective material (not shown) has been fed between the dies. Under these circumstances, the press should be shut down immediately for inspection. Of course, the manual method cannot detect these anomalous deviations in the press load signal as quickly or as efficiently as is desired.

The microcomputer 15 may perform a waveform comparison between successive cycles by at least two methods. Shown in FIG. 19 is a difference or overlap comparison between the two press load cycles 266, 267. A difference signal 275 is calculated at each phase point by subtracting the digitized value of the first cycle 266 at each phase point from the respective digitized value for the second cycle 267 at the same phase point. Thus the difference signal 275 in FIG. 19 represents, at each phase point, the difference in height or volts ($\Delta V$) between the two cycles 266 and 267 shown in FIG. 18. The difference signal 275 is compared to positive and negative error thresholds 276 and 277 to detect the presence of an anomaly between the two cycles 266, 267 of the press load signal. As shown in FIG. 19, an anomaly is indicated by a substantial negative deviation generally designated 278 in the difference signal 275.

A drawback of the difference or overlap method of comparison between the press load cycles is that the difference unduly emphasizes low frequency or large scale offsets between the successive cycles 266, 267. The waveform of the first cycle 266, for example, is offset in a negative direction from the waveform of the second cycle 267.

To eliminate the effect of offsets, a feature or slope comparison is performed between the two press load cycles resulting in the slope comparison signal 279 shown in FIG. 20. The slope comparison signal 279 is substantially the differential of the difference signal 275 in FIG. 19. Preferably, the slope comparison signal 279 represents the angular change in the tangents ($\Delta\theta_{TANGENTS}$) between the first and second waveforms 266, 267 at each phase point. Assuming that the speed of the press is constant and representing the waveform of the first cycle 266 as S' and the waveform of the second cycle 267 as S, the tangent of the first waveform S' at a time t is represented as:

$$(S'(t) - S'(t - \Delta t)) k$$

where $\Delta t$ represents the time between samples and k represents a conversion or scale factor. Therefore, the difference in tangents is calculated by the equation:

$$(S(t) - S(t - \Delta t)) k - (S'(t) - S'(t - \Delta t)) k$$

This difference in tangents signal could be used as a comparison between the waveforms of the successive cycles 266, 267. It does, however, unduly emphasize differences in the tangents when the press load signal is rapidly increasing or decreasing and the tangents have large values. A better comparison between the tangents is obtained by considering the difference in the angle ($\Delta\theta$) between the tangent lines. In order to convert between the change in tangents and the change in the angle ($\Delta\theta$), the formula for the tangent of the difference between two angles $\alpha$ and $\beta$ can be considered:

$$TAN(\alpha - \beta) = (TAN\,\alpha - TAN\,\beta)/(1 + TAN\alpha\,TAN\beta)$$

Therefore, it is evident that the difference in tangents $TAN\alpha - TAN\beta$ should be adjusted by the factor of $1/(1 + TAN\alpha\,TAN\beta)$ so that the comparison between the tangents will not be unduly emphasized when the tangents are appreciably large. In practice, this adjustment factor is rather arbitrary due to the arbitrary selection of the conversion or scale factor k.

As shown in FIG. 20, the slope comparison signal 279 is compared to positive and negative error thresholds 280, 281 in order to detect an anomaly. In FIG. 20, an anomaly is indicated by the S-shaped pulse generally designated 282. In practice, it is more convenient to calculate the difference in tangents and compare the difference in tangents to a variable error threshold which is a function of the correction factor $1/(1 + TAN\alpha\,TAN\beta)$. The threshold, for example, may be obtained from a look up table as is further described in connection with FIG. 22.

The microcomputer 15 may also use the digitized press load signal to detect gradual dulling or wear of the progressive dies 19, 20 (FIG. 1). In contrast to waveform analysis of the press load signal as described in connection with FIGS. 18-20, for detecting die wear the microcomputer 15 analyzes the peak loads 283 as a function of time over a large number of cycles. Just after new or sharpened dies 19, 20 are placed in the punch press 11 (FIG. 1) an initial average of the peak load is calculated over a substantial number of cycles for example 64 cycles. For progressive dies, initial averages are calculated for each die station and the die wear is sensed independently for each die station, so that the press may be stopped and the dies sharpened when any one of the die stations becomes excessively dull or worn.

Based on the initial average, a die wear threshold 284 is calculated proportional to the initial average. Preferably, the die wear threshold is about 110% of the initial average. After the initial average is computed, and during operation of the punch press, a running average 285 is calculated for comparison to the die wear threshold A dull die or dull die station is detected when the running average 285 exceeds the die wear threshold 284. When the microcomputer is programmed in this fashion to detect die wear, it is convenient to tabulate the number of parts or press load cycles having occurred after a new die or a sharpened die is inserted into the press. It is also convenient to tabulate the total number of parts produced with a new die regardless of the number of times the die has been sharpened. Moreover, it is desirable to tabulate the number of times that a die has been sharpened, and the average number of parts produced by the die once it is sharpened. This historical data is useful, for example, in predicting when a die needs to be sharpened as the parts having been produced for the current sharpening approaches the parts produced for previous sharpenings. The number of parts produced for a particular die and the number of times the die has been sharpened may indicate when a new set of dies may be required.

Figure 22:
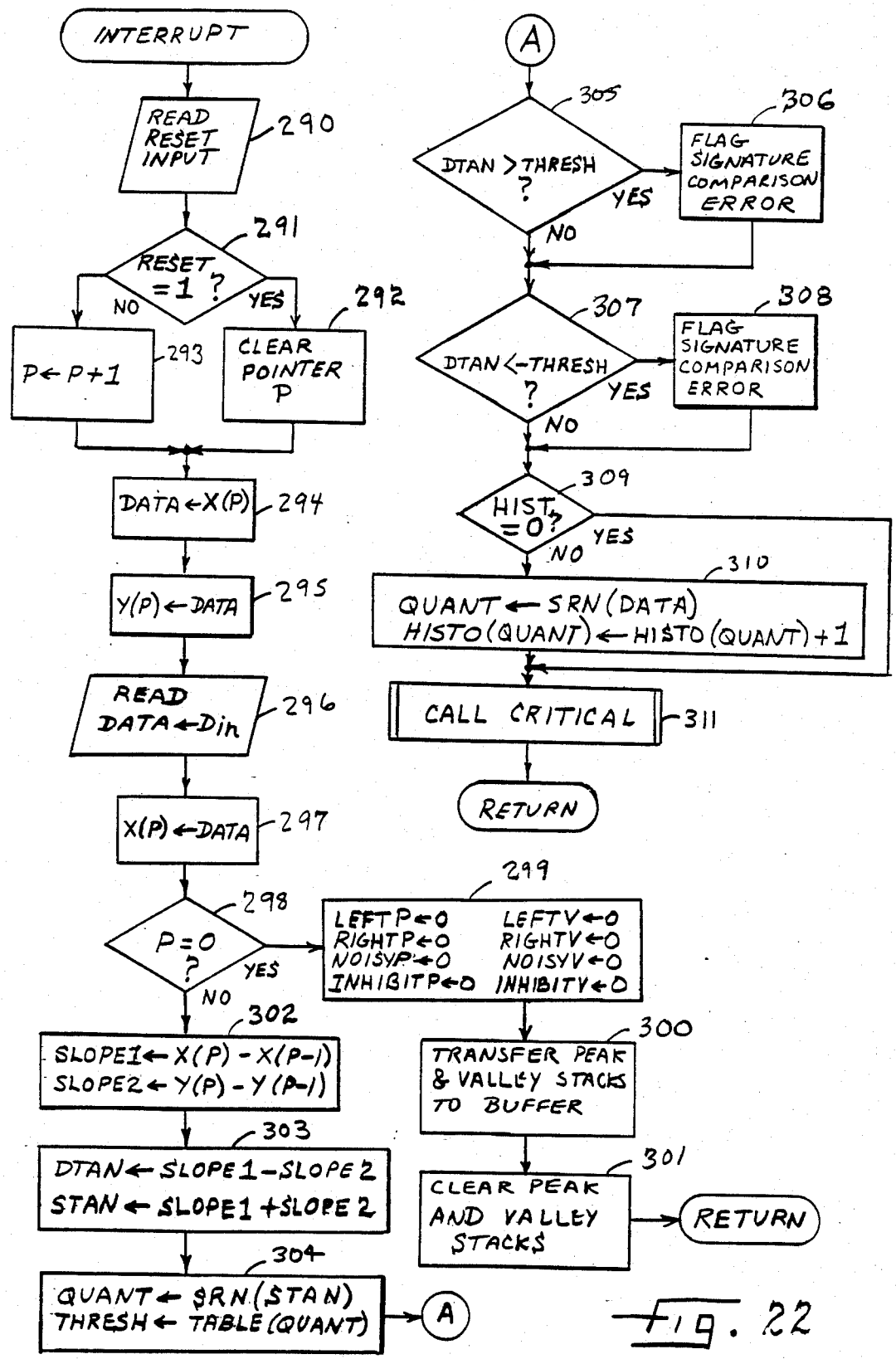
FIG. 22 is a flowchart of an interrupt procedure for real-time waveform comparison, histogram generation and detection of peaks and valleys in the digitized press load signal from the interface circuits of FIG. 15.

Turning now to FIG. 22 there is shown an interrupt procedure executed by the microcomputer 15 for reading in the press load signal sampled and digitized by the circuits shown in FIG. 15 in order to perform the waveform analysis illustrated in FIGS. 16–20. The interrupt procedure in FIG. 22 is executed once for each phase point indicated by the precision resolver means 16' (FIG. 15). In the first step 290 the microcomputer 15 reads the reset input of the input/output unit 32 (FIG. 15) to determine whether the crank shaft 17 of the punch press is at its zero or reference phase position. In step 291 the reset input is compared to one, and if it is equal to one, the crank shaft 17 is in its zero or reference phase position. A pointer P is used to count or register the precise phase point of the crank shaft 17. Therefore, in step 292, the pointer P is cleared if the reset signal was found to be one in step 291. Otherwise, if the reset input was not found to be one in step 291, then in step 293 the pointer P is incremented.

The pointer P identifies the current phase point in the current cycle of the press load signal and is also used as an index for the storage of the digitized samples of the press load signal. An array X is used to store the digitized samples for the waveform of the current cycle 267 and an array Y is used to store the digitized samples of the waveform for the immediately preceeding cycle 266. Upon each interrupt, a new digitized sample is obtained from the latch 253 but before the new digitized sample is stored in the array X the previous sample for the same phase point is transferred to the array Y. To perform the transfer between the arrays X and Y, in step 294 the location X(P) of the array X is transferred to a register DATA in the microcomputer, and in step 295 the contents of the register DATA are stored in the Y(P) location of the Y array. Then in step 296 the new sample Din is read from the latch 253 and transferred to the register DATA. In step 297 the contents of the register DATA are transferred to the location X(P) of the array X.

Preferably, the zero or reference phase point corresponds to a "no load" point on the press load signal. Then, the zero phase interrupt can be used to initialize variables and stacks used for finding the peaks and valleys in the press load signal. For this purpose, in step 298 the pointer P is compared to zero to detect the zero phase point. At the zero phase point in step 299 the variables LEFTP, RIGHTP, NOISYP, INHIBITP, LEFTV, RIGHTV, NOISYV, INHIBITV are all cleared for the detection of the peaks and valleys in the next cycle of the press load signal. The variables ending in P are used for sensing the peaks, and the variables ending in V are used for sensing the valleys according to the general procedure already discussed in connection with FIG. 13. In step 300 the peak and valley stacks used for storing the detected peaks and valleys are transferred to a buffer which is accessed by the foreground routines and the executive program of the microcomputer 15. When the foreground routine shown in FIG. 14 analyzes the peaks, for example, the peak values are obtained in step 220 from the buffer. This prevents contention between the interrupt procedure of FIG. 22 and the foreground routines and executive procedure of the microcomputer. After the peak and valley stacks are transferred to the buffer, in step 301, the peak and valley stacks are cleared in order to receive the peaks and valleys found in the upcoming cycle of the press load signal.

If in step 298 the pointer P was not found to be equal to zero, then in step 302 the slopes or tangents of the waveforms of the current and previous cycles 267, 266 respectively, are calculated as the difference between the current and previous digitized sample at the current phase point. SLOPE 1 represents the tangent of the waveform of the current cycle 267, and SLOPE 2 represents the slope or tangent of the waveform for the previous cycle 266 (See FIGS. 16 and 18). Then in step 303, a slope comparison is performed between these two press load cycles by calculating the difference in tangents DTAN as the difference between the two slopes. Also, the sum of the tangents STAN is also calculated in order to increase the error threshold for increasing tangents or slopes. The error threshold THRESH is prestored in a table for a plurality of slope ranges. The table includes numerical values increasing as a function of approximately $1+KN^2$ where N is the index for the particular table entry and K is a predetermined constant selected to desensitize the slope comparison for large tangents or slopes. The particular value for K should be determined by simple experiment so that the threshold value tracks the amplitude of the difference in slope DTAN when there are no anomalies present. In step 304, for example, the sum of the tangents STAN is quantized by right shifting a computer register containing the sum of the slopes by a sufficient number of binary places so that the sum of the tangents is quantized to a number of levels corresponding to the number of table entries. Thus, for each sum of the tangents STAN a threshold THRESH is read from the table at the position or index specified by the quantized value QUANT. If the value for the constant K is properly chosen, then the threshold THRESH should track the amplitude of the difference in slopes DTAN for both high and low slopes of the press load signal. In order to determine the constant K, for example, the difference in slopes DTAN is divided by the threshold THRESH to determine a quotient signal which in the absence of anomalies should be relatively constant in amplitude for the preferred value of K as the slope of the press load signal increases and decreases. In practice, the preferred value of the constant K will depend on the speed of the press, the number of samples or phase points per cycle of press operation, the mechanical play in the press, and the particular construction of the dies and the material being punched or pressed. The precise value of the constant K, however, is not critical.

It is assumed that the positive and negative error thresholds (see FIG. 20) have equal magnitudes. Therefore, in step 305 the difference in tangents DTAN is first compared to the positive threshold value THRESH and in step 306 a signature comparison error is flagged when the positive threshold is exceeded. Flagging of the error, for example, results in the microcomputer 15 shutting down the punch press for inspection. Also, when a signature error is flagged, the interrupt of the microcomputer may be masked or inhibited so that the arrays X and Y will retain the two complete cycles of the press load signal exhibiting the anomaly for graphing or plotting. Similarly, in step 307 the difference in tangents DTAN is compared to the negative error threshold −THRESH and when the difference in tangents is less than the negative threshold a signature comparison error is flagged in step 308.

In order to generate a press load histogram as shown in FIG. 17 in an array HISTO, in step 309 a switch HIST is tested to determine whether occurrences should be accumulated. If the switch HIST is not equal to zero, then in step 310 the current sample of the press load signal in the register DATA is quantized by right shifting the register contents a predetermined number of binary places, and the quantized value QUANT is used as an index for incrementing the particular array entry HISTO(QUANT) corresponding to the particular value of the current sample of the press load signal. As was discussed in connection with FIG. 17, the press load histogram is generated over a number of cycles of operation of the punch press in order to determine a "no load" base line for determining the press load signal in volts corresponding to a zero load condition. In order to obtain a histogram over a certain number of cycles, a foreground subroutine or the executive procedure for the microcomputer clears the histogram switch HIST and then clears the histogram array HISTO. Then, in order to accumulate the histogram, the histogram switch HIST is set to one. After the predetermined number of press cycles, the foreground subroutine or executive procedure sets the histogram switch HIST back to zero, and the histogram is retained in the histogram array HISTO. The base line value is determined as the press load value corresponding to the index or position in the histogram array HISTO having the maximum value or number of occurrences.

As a final step in the interrupt procedure of FIG. 22, a subroutine CRITICAL is called in step 311 in order to find the maxima and minima in the current cycle of the press load signal.

Figure 23:
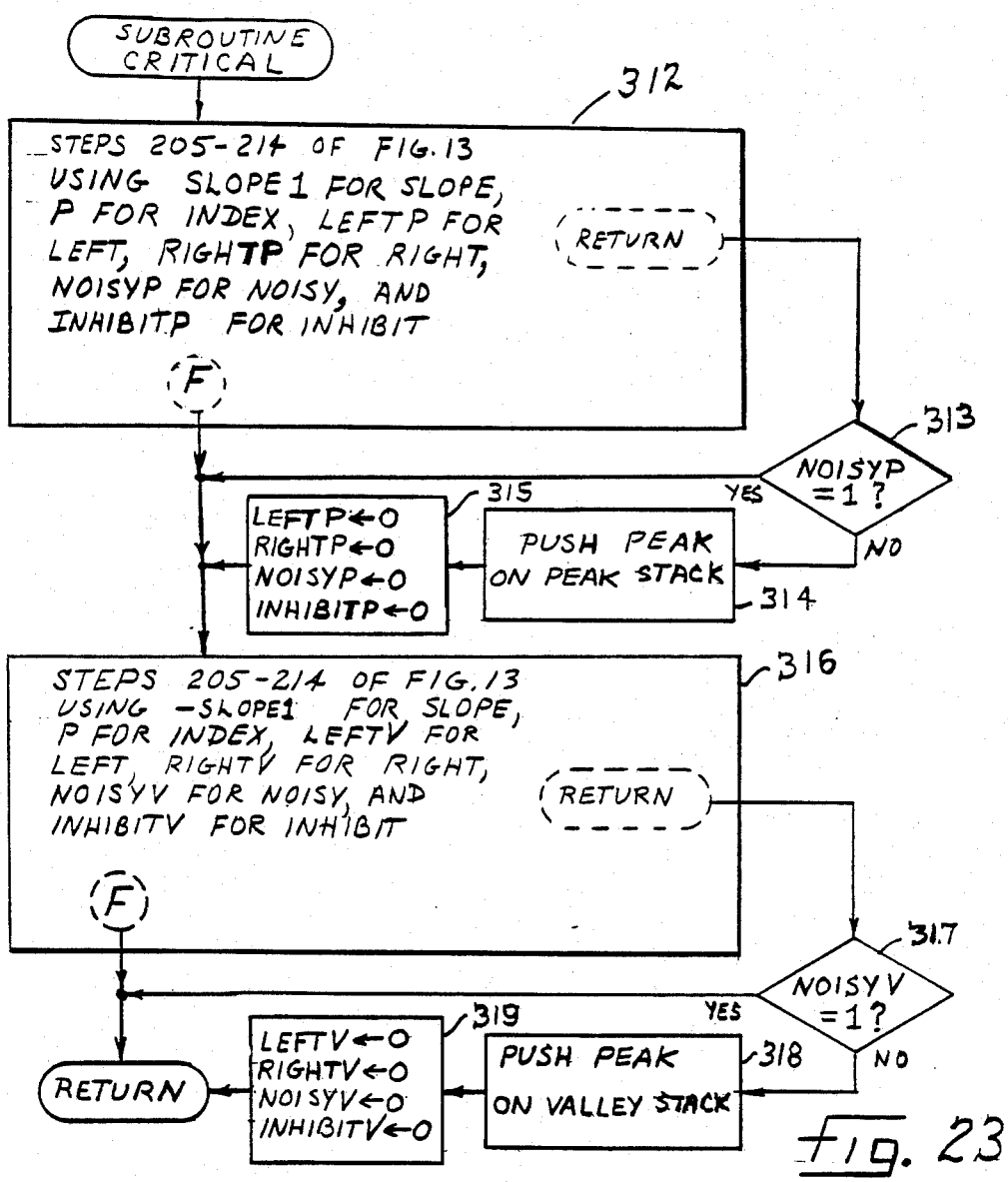
FIG. 23 is a flowchart of a subroutine called by the interrupt procedure of FIG. 22 to detect the peaks and valleys in the digitized press load signal.

Turning to FIG. 23, there is shown a flowchart of the subroutine CRITICAL. This subroutine essentially uses the procedure of FIG. 13 twice, a first time to detect the maxima or peak values, and a second time to detect the minima or valley points. In step 312, for example, steps 205–214 of FIG. 13 are performed using SLOPE1 for SLOPE, P for INDEX, LEFTP for LEFT, RIGHTP for RIGHT, NOISYP for NOISY, and INHIBITP for INHIBIT. If a return is generated by these steps, then in step 313 the noise flag NOISYP is compared to one to determine whether the peak indication was caused by noise. If not, then in step 314 the pointer value PEAK at which the peak was found is pushed on the peak stack, and in step 315 the variables LEFTP, RIGHTP, NOISYP, INHIBITP are cleared in anticipation of finding the next peak. If a peak was not found in step 312, or if the peak was caused by noise, then in step 316 the procedure of FIG. 13 is again performed to check for a minima or valley point. The same procedure can be used for detecting minima that was used for detecting maxima merely by changing the polarity of the sampled press load signal. Thus, in step 316 steps 205–214 of FIG. 13 are performed using −SLOPE1 for slope, P for INDEX, LEFTV for LEFT, RIGHTV for RIGHT, NOISYV for NOISY, and INHIBITV for INHIBIT. The polarity of the sampled press load signal was inverted by using −SLOPE1 for SLOPE. When a minimum is found the noise flag NOISYV is tested in step 317 to determine whether the minimum resulted from a noise pulse. If not, then in step 318 the pointer PEAK is pushed on the valley stack, and in step 319 the variables LEFTV, RIGHTV, NOISYV, and INHIBITV are cleared in anticipation of finding the next minimum in the press load signal, and execution returns. If a minimum was not found in step 316 or if the minimum was due to a noise pulse, execution also returns. The minima in the valley stack are used by the foreground subroutines or the executive procedure, for example, for comparison to respective high and low threshold values to generate warning or control signals. Of particular interest are the "reverse peak loads" which are the minima having values below the "no load" base line. (See FIG. 16).

Figure 24:
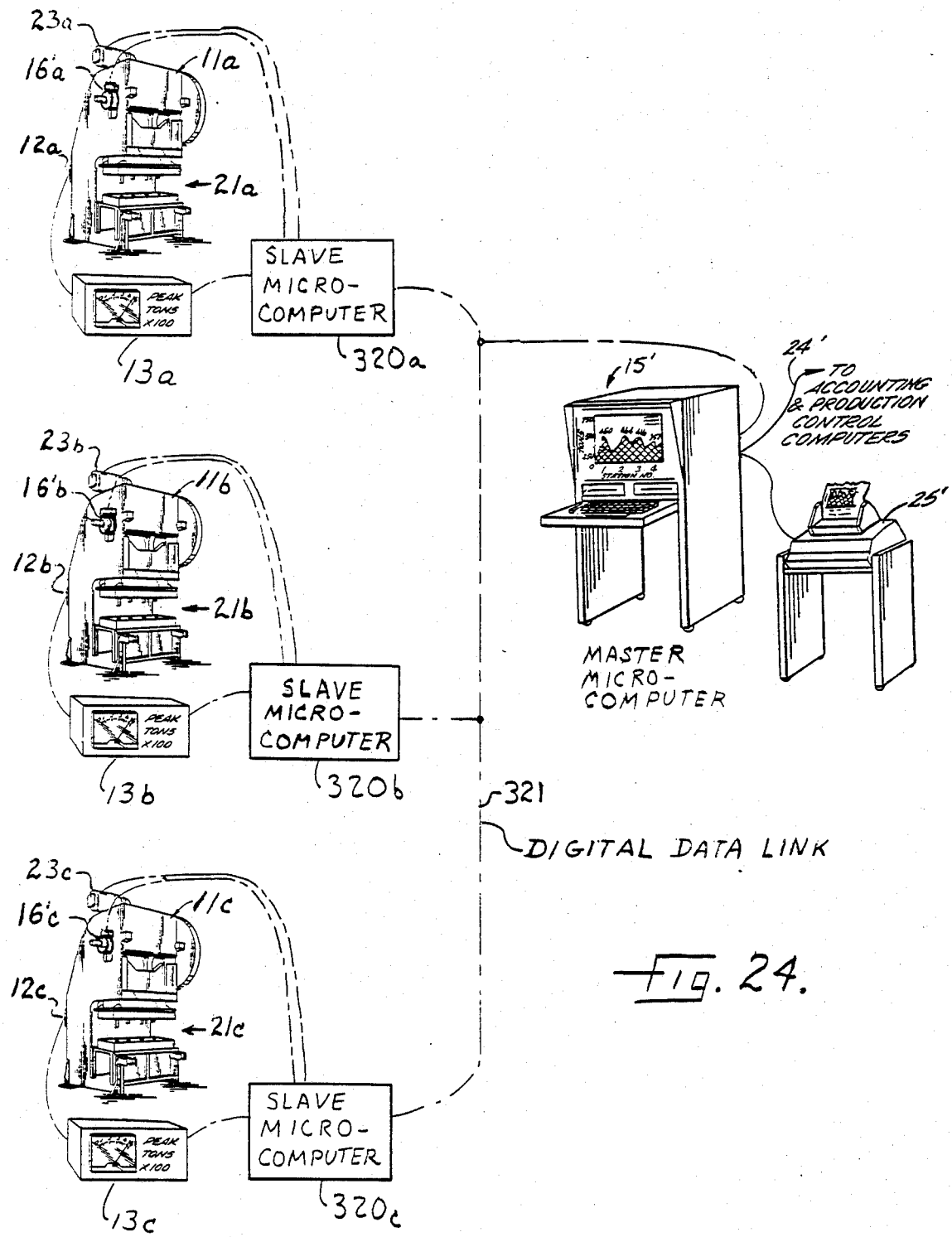
FIG. 24 is a diagram of a load monitoring system for a number of punch presses, each punch press having a local numerical computer for performing real-time waveform comparison, and a central computer being provided for initializing the local computers, receiving summary information and providing user access.

Turning now to FIG. 24, there is shown a load monitoring and control system according to an important aspect of the invention for the monitoring and control of a plurality of presses such as the punch presses 11a, 11b, and 11c. The presses are fitted with respective precision resolver means 16′a, 16′b, and 16′c as described in connection with FIG. 15. Otherwise, the punch presses 11a, 11b and 11c are similar in construction to the press 11 shown in FIG. 1, with identical components having similar reference numerals suffixed by the letters a, b, and c for the respective presses 11a, 11b and 11c.

Associated with each press 11a, 11b and 11c is a respective slave microcomputer 320a, 320b, and 320c, each of which receives a respective press load signal from a respective buffer amplifier 13a, 13b and 13c in addition to the respective phase indicating signal from the respective precision resolver means 16′a, 16′b, and 16′c. Each slave microcomputer includes an interrupt procedure as shown in FIG. 22. In addition, each slave microcomputer executes an executive procedure for turning off the respective punch press motor 23a, 23b or 23c in response to a signature comparison error being flagged in either steps 306 or 308 or in response to the maximum or peak loads or the minimum or reverse loads being out of predetermined ranges. Preferably the slave microcomputers 320a, 320b, 320c have their interrupt and executive procedures stored in read only memory, but have threshold or limit values stored in random access memory. Further, the executive procedures of the slave microcomputers can recognize commands from a master microcomputer 15′ substantially similar to the microcomputer 15 previously described. The commands are sent by the master microcomputer 15′ over a digital data link 321 to all of the slave microcomputers and include an address specifying that a particular one or all of the slave microcomputers are to respond to the command. These commands include, for example, a command to shut down the respective punch press, a command to start up the respective punch press, a command to set or change specified thresholds or limit values stored in random access memory of the addressed slave microcomputer, and commands for enabling the addressed slave microcomputer to transmit information stored in any specified address location of range in random access memory. The master microcomputer 15', for example, can request the current thresholds or limit values being used by a particular slave microcomputer, the maxima or minima stored in the peak and valley buffers, or the entire contents of the X and Y arrays storing the digitized samples of the press load signal. In other words, the master microcomputer 15' displays or tabulates data for a selected one of the punch presses 11a, 11b, 11c in the same manner as the microcomputer 15 shown in FIG. 1. Moreover, the master microcomputer periodically interrogates the slave microcomputers 320a, 320b and 320c for the purpose of obtaining accounting and production information to be transmitted over the link 24' to accounting and production control computers (not shown).

For the monitoring and control of numerous presses, the system shown in FIG. 24 is preferred over a system having one microcomputer such as is shown in FIG. 1 for each press. An economy of scale results since the slave microcomputers 320a, 320b, 320c are relatively inexpensive compared to the master microcomputer, but the display and tabulating functions performed by the master microcomputer are economically shared among the plurality of punch presses 11a, 11b and 11c. A single printer 25', for example, can generate all of the tabulated data that a machine operator would care to know about the operation of the punch presses. The machine operator may also use the master microcomputer at a central location remote from the slave microcomputers 320a, 320b, 320c and the punch presses 11a, 11b, 11c. The digital data link 321 can transmit information over a relatively long distance with a high immunity from noise and interference. The digital link 321, for example, incorporates a standard RS232 transmission format and all of the slave microcomputers 320a, 320b, 320c are connected in parallel to the digital data link so that additional presses and respective slave microcomputers are easily added to the system. The slave microcomputers 320a, 320b and 320c are preferably located very close to the punch presses 11a, 11b and 11c to enhance the reliability of control for shutting down their respective punch presses when abnormal operation is detected, and also to simplify the transmission of the analog press load signal from the respective buffer amplifiers 13a, 13b, 13c to their respective slave microcomputers.

From the above, it is seen that a press control system has been described which monitors and is responsive to the loads associated with individual die stations in a progressive die. The press load as a function of time is automatically analyzed to determine and display the number of die stations and the peak load associated with each die station. Thus, the present invention is useful for automatic control of progressive die presses and for supplying data to an accounting or production control computer system. The press control system determines the number of acceptable die loads or acceptable parts, and the number of unacceptable die loads or damaged and rejected parts produced by the press. For visual display to the operator, the press load as a function of time is graphed and scaled by the speed of the press. Gradual dulling or wear of the dies is monitored to determine when sharpening is required. To detect anomalies which could occur at any phase in the press cycle, a precision resolver means and associated circuitry and software has been disclosed for performing a waveform comparison between successive cycles even when the speed of the press is highly variable. A master/slave computer system is preferred for the monitoring and control of multiple presses.

What is claimed is:

1. A system for monitoring loads that are cyclically applied to a force carrying member comprising a load transducer means for generating an electrical signal indicating the stress applied to said member, analog-to-digital converter means for generating a time series of numerical load values representative of said electrical signal over a substantial portion of at least one operating cycle, and peak finding means responsive to the time series of numerical load values for automatically indicating which of the numerical load values within an individual operating cycle represent at least two different peak loads applied to said member within said individual operating cycle in comparison to adjacent numerical load values within said individual operating cycle.

2. The system as claimed in claim 1, further comprising peak analyzer means for automatically comparing the numerical load values representing peak loads to at least one predetermined limit value and generating a press control signal in response to the comparison.

3. The system as claimed in claim 1, wherein the transducer means comprises a pair of output terminals with a piezoelectric element therebetween, said electrical signal being generated at said output terminals.

4. The system as claimed in claim 1, further comprising resolver means for indicating individual cycles of the loads applied to said member, and automatic means responsive to the indication of individual cycles for associating the numerical load values representing peak loads with their order of occurrence within individual cycles.

5. A system for monitoring loads that are cyclically applied to a force carrying member comprising a load transducer means for generating an electrical signal indicating the stress applied to said member, analog-to-digital converter means for generating a time series of numerical load values representative of said electrical signal, peak finding means responsive to the time series of numerical load values for automatically indicating which of the numerical load values represent peak loads cyclically applied to said member, resolver means for indicating individual cycles of the loads applied to said member, and automatic means responsive to the indication of individual cycles for associating the numerical load values representing peak loads with their order of occurrence within individual cycles, graphing means for graphically displaying the time series of numerical load values starting at approximately a predetermined phase of an individual cycle indicated by the resolver means, and annotating means for automatically labeling the peaks on the graph with their respective load values representing peak loads.

6. The system as claimed in claim 5, further comprising speed determining means, responsive to the indication of the resolver means, for indicating the frequency of the cycles of the loads applied to said force carrying member, and automatic means for adjusting the time scale of the graphical display in response to the indication of the speed determining means.

7. A system for monitoring loads that are cyclically applied to a force carrying member comprising load transducer means mounted on said force carrying member for generating an electrical signal indicating the stress applied to said member, analog-to-digital converter means for generating a time series of numerical load values representative of said electrical signal, resolver means for indicating individual cycles of the loads applied to said member, graphing means for graphically displaying the time series of numerical load values starting at approximately a predetermined phase of an individual cycle indicated by the cycle indicating means, and speed determining means, responsive to the indication of the cycle indicating means, for indicating the frequency of the cycles of the loads applied to said force carrying member, wherein the graphing means has automatic means for adjusting the time scale of the graphical display in response to the indication of the speed determining means.

8. The system as claimed in claim 7, further comprising means for generating a sweep trigger signal at a predetermined phase indicated by the cycle indicating means, wherein the speed determining means has means for computing the time between successive sweep trigger signals, and further comprising array loading means for loading a predetermined amount of random access memory with the numerical load values generated at periodic intervals, wherein the period is a predetermined fraction of the time between successive sweep trigger signals, and the graphing means has means for graphing the numerical load values stored in the predetermined amount of random access memory.

9. A system for monitoring loads that are cyclically applied to a force carrying member in a press fitted with a progressive die having a plurality of die stations, each die station being adapted to create respective loads applied to the force carrying member during each load cycle, said system comprising, in combination, a load transducer means for generating an electrical signal indicating the load applied to said member, analog-to-digital converter means for generating a time series of numerical load values representative of said electrical signal, peak finding means responsive to the time series of numerical load values for automatically indicating which of the numerical load values represent peak loads cyclically applied to said load member, means for periodically generating a trigger signal at approximately a predetermined phase in the load cycle, and means for automatically associating the numerical load values representing peak loads with corresponding ones of the die stations by sequentially associating the peak loads occurring after the most recent trigger signal with the die stations.

10. The system as claimed in claim 9, further comprising peak analyzer means for automatically comparing the numerical load values representing the peak loads associated with each of the die stations to respective predetermined threshold values, and means for generating a press control signal in response to the comparisons.

11. The system as claimed in claim 10, wherein the predetermined threshold values include at least one high threshold value and at least one low threshold value associated with each die station and wherein said means for generating a press control signal responds when the respective peak loads is substantially outside of the range between the respective high and low threshold values.

12. The system as claimed in claim 10, wherein the predetermined threshold values include a limit threshold and a material threshold associated with each die station, and wherein said means for generating a press control signal in response to the comparisons compares each limit threshold value to individual ones of the numerical load values representing the respective peak loads and compares each material threshold value to an average of successive numerical load values representing the respective peak loads.

13. The system as claimed in claim 10, wherein the predetermined threshold values include a die wear threshold value associated with each die station which is predetermined in response to an initial average of the peak loads for the die station.

14. The system as claimed in claim 13, wherein each die wear threshold value is predetermined as proportional to the respective initial average.

15. The system as claimed in claim 13, wherein said means for generating a press control signal compares each die wear threshold to an average of successive numerical load values representing the respective peak load.

16. The system as claimed in claim 9, further comprising graphing means for graphically displaying at least a portion of the time series of numerical load values.

17. The system as claimed in claim 16, further comprising annotating means for displaying symbols associating peak values in the graphical display of the time series of numerical load values with their associated die stations.

18. The system as claimed in claim 17, wherein the annotating means further comprises means for automatically labeling the peaks of the graphical display of the time series of numerical load values with numerals quantifying the respective numerical load values representing the respective peak loads.

19. The system as claimed in claim 16, further comprising annotating means for automatically labeling the peaks of the graphical display of the time series of numerical load values with numerals representing the respective peak loads.

20. A system for monitoring loads that are cyclically applied to a force carrying member comprising a load transducer means for generating an electrical signal indicating the stress applied to said member, analog-to digital converter means for generating a time series of numerical load values representative of said electrical signal, means responsive to the time series of numerical load values for determining at least one peak load for each individual cycle, and means for comparing the peak loads to at least one predetermined threshold value to generate a control signal, wherein said means for comparing generates a press control signal by comparing an average of said peak loads for successive cycles to said predetermined threshold value.

21. The system as claimed in claim 20, wherein the means for comparing generates a control signal to stop the application of the loads when said average of peak loads exceeds said threshold.

22. The system as claimed in claim 20, wherein the means for comparing generates a control signal to stop the application of the loads when said average of said peak loads falls below said threshold.

23. The system as claimed in claim 20, wherein said threshold is predetermined in response to an initial average of said peak loads.

24. The system as claimed in claim 20, wherein said threshold is predetermined as proportional to an initial average of said peak loads.

25. The system as claimed in claim 20, further comprising means responsive to the time series of numerical load values for determining at least one reverse peak load for each individual cycle, and means for compar ing the reverse peak loads to at least one predetermined threshold.

26. A system for monitoring loads that are cyclically applied to a force carrying member comprising a load transducer means for generating an electrical signal indicating the stress applied to said member, analog-to-digital converter means for generating a time series of numerical load values representative of said electrical signal, resolver means for indicating individual cycles of the loads that are applied to said member, means responsive to the time series of numerical load values and the resolver means for determining at least one peak load for each individual cycle, and means for comparing the peak loads to a set of predetermined threshold values to generate a control signal, wherein said set of threshold values includes a high limit threshold, a low limit threshold, a high material threshold and a low material threshold, and wherein said means for comparing generates said control signal to stop the application of said loads when any one of said peak loads is substantially outside of the range between the high and low limit thresholds, and when an average of said peak loads for successive cycles is substantially outside of the range between the high and low material thresholds.

27. The system as claimed in claim 26, wherein the range between the low and high material thresholds is substantially smaller than and included within the range between the low and high limit thresholds.

28. The system as claimed in claim 26, wherein said limit and material thresholds are periodically updated in proportion to an average of successive ones of the peak loads.

29. The system as claimed in claim 26, wherein said set of thresholds includes a wear threshold, said means for comparing generates a control signal when an average of said peak loads for successive cycles substantially exceeds said wear threshold, and said wear threshold is determined in proportion to and substantially exceeds an initial average of successive ones of the peak loads.

30. A system for monitoring loads that are cyclically applied to a force carrying member comprising a load transducer means for generating an electrical signal indicating the force applied to said member, resolver means for indicating individual cycles of the loads applied to said member and also indicating phase points over at least a substantial part of the cycle of load application, analog-to-digital converter means for generating respective numerical load values representative of the value of said electrical signal at said phase points for successive cycles of load application, and means for comparing the numerical load values for the same phase points between at least two successive cycles of load application.

31. The system as claimed in claim 30, wherein the means for comparing generates a control signal when there is a substantial difference between the numerical load values for the same phase points of the two successive cycles of load application.

32. The system as claimed in claim 30, wherein the means for comparing generates a control signal when there is a substantial difference between the tangents of the numerical load values for the same phase points of the two successive cycles of load application.

33. The system as claimed in claim 30, wherein the means for comparing generates a control signal when there is a substantial angular difference between the tangents of the numerical load values for the same phase points of the two successive cycles of load application.

34. The system as claimed in claim 30, wherein the means for comparing generates a control signal by comparing a threshold to the difference between the tangents of the numerical load values for the same phase points of the two successive cycles of load application, said threshold being an increasing function of said tangents.

35. The system as claimed in claim 30, wherein the means for comparing include a microcomputer having random access memory for storing the numerical load values for at least one cycle of the load application.

36. The system as claimed in claim 35, wherein the resolver means generates a binary phase signal which interrupts said microcomputer at said phase points, and during each interrupt said microcomputer reads a respective one of said numerical load values from said analog-to-digital converter, stores the numerical load value in a respective address location of said random access memory after reading the value previously stored at the respective address location, and compares said numerical load value with said value previously stored.

37. The system as claimed in claim 35, wherein said microcomputer executes a procedure for finding maximum and minimum ones of the numerical load values.

38. The system as claimed in claim 36, wherein said microcomputer executes a procedure for finding a "no load" base line and uses the "no load" base line for determining the magnitudes of reverse loads.

39. A system for the monitoring and control of a plurality of machines for cyclically applying force, said system comprising:

for each machine, a load transducer for generating an electrical load signal indicating the force carried by a force carrying member of said machine, resolver means for generating an electrical signal indicating the phase of the force application cycle, a slave microcomputer with an analog-to-digital converter and input/output circuits for digitizing the load signal, said slave microcomputer executing a procedure for storing the digitized values in random access memory, finding peak values of the load signal, comparing the peak values to at least one predetermined threshold value, and generating a control signal to stop the respective machine from cyclically applying said force when the peak values substantially reach said threshold value;

said system further comprising a master microcomputer including means for graphing, storing, and tabulating data, wherein said master microcomputer is linked via a digital data link to said slave microcomputer and said master and slave microcomputers execute procedure to permit an operator at the master microcomputer to request and obtain from a selected slave microcomputer selected digitized values of the load signal for a respective one of the machines, and to obtain the peak values found by a selected slave microcomputer.

40. The system as claimed in claim 39, wherein the procedures executed by the master and slave microcomputers permits an operator at the master microcomputer to stop and start a selected machine, and to change the threshold value for a selected slave microcomputer.

* * * * *